(12) United States Patent
Shields et al.

(10) Patent No.: US 8,438,174 B2
(45) Date of Patent: May 7, 2013

(54) AUTOMATED FORENSIC DOCUMENT SIGNATURES

(75) Inventors: Thomas Clay Shields, Washington, DC (US); Ophir Frieder, Chicago, IL (US); Marcus A. Maloof, Washington, DC (US)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 12/822,722

(22) Filed: Jun. 24, 2010

(65) Prior Publication Data

US 2010/0287196 A1 Nov. 11, 2010

Related U.S. Application Data

(63) Continuation-in-part of application No. 11/963,186, filed on Dec. 21, 2007, now Pat. No. 8,280,905, and a continuation-in-part of application No. 12/118,942, filed on May 12, 2008, now Pat. No. 8,312,023.

(51) Int. Cl.
*G06F 17/30* (2006.01)

(52) U.S. Cl.
USPC .......................................... 707/755; 726/26

(58) Field of Classification Search .................. 713/180, 713/186; 707/741, 914
See application file for complete search history.

(56) References Cited

U.S. PATENT DOCUMENTS

| | | | | |
|---|---|---|---|---|
| 4,697,209 A | * | 9/1987 | Kiewit et al. | 725/19 |
| 5,337,360 A | * | 8/1994 | Fischer | 713/176 |
| 5,960,081 A | * | 9/1999 | Vynne et al. | 713/176 |
| 6,014,183 A | * | 1/2000 | Hoang | 348/702 |
| 6,078,917 A | | 6/2000 | Paulsen et al. | |
| 6,263,349 B1 | | 7/2001 | Anderson | |
| 6,279,010 B1 | | 8/2001 | Anderson | |
| 6,345,283 B1 | | 2/2002 | Anderson | |
| 6,683,966 B1 | * | 1/2004 | Tian et al. | 382/100 |
| 6,772,196 B1 | | 8/2004 | Kirsch et al. | |
| 7,058,968 B2 | | 6/2006 | Rowland et al. | |
| 7,080,091 B2 | | 7/2006 | Matsuda | |
| 7,200,244 B2 | | 4/2007 | Yacobi | |
| 7,206,303 B2 | | 4/2007 | Karas et al. | |
| 7,260,722 B2 | * | 8/2007 | Forstrom et al. | 713/176 |

(Continued)

FOREIGN PATENT DOCUMENTS

WO WO-2007-075813 7/2007

OTHER PUBLICATIONS

Carrier, The Sleuth Kit Informer, Jul. 2003.*

(Continued)

*Primary Examiner* — James Trujillo
*Assistant Examiner* — William Spieler
(74) *Attorney, Agent, or Firm* — Matthew K. Ryan; Brian M. McGuire; Frommer Lawrence & Haug LLP

(57) ABSTRACT

Methods and systems are provided for a proactive approach for computer forensic investigations. The invention allows organizations anticipating the need for forensic analysis to prepare in advance. Forensic signatures are created including a digital fingerprint and other information associated with a file. In one aspect, informational signatures are created, which may assist in determining what information is included in a file. In another aspect, the digital fingerprint may represent contents of the file and is resistant to minor modification of the file. In another aspect, fingerprints can be compared in parallel on different computers.

11 Claims, 12 Drawing Sheets

U.S. PATENT DOCUMENTS

| | | | |
|---|---|---|---|
| 7,289,643 B2 * | 10/2007 | Brunk et al. | 382/100 |
| 7,359,006 B1 * | 4/2008 | Xiang et al. | 348/515 |
| 7,506,379 B2 | 3/2009 | Abali et al. | |
| 7,738,704 B2 * | 6/2010 | Lienhart et al. | 382/181 |
| 7,739,114 B1 * | 6/2010 | Chen et al. | 704/270 |
| 7,742,617 B2 | 6/2010 | Smith et al. | |
| 7,899,205 B2 | 3/2011 | Pelly et al. | |
| 7,954,151 B1 | 5/2011 | Nisbet et al. | |
| 2002/0116392 A1 * | 8/2002 | McGrath et al. | 707/104.1 |
| 2003/0103645 A1 * | 6/2003 | Levy et al. | 382/100 |
| 2003/0105739 A1 | 6/2003 | Essafi et al. | |
| 2003/0110396 A1 | 6/2003 | Lewis et al. | |
| 2003/0149744 A1 | 8/2003 | Bierre et al. | |
| 2004/0028281 A1 * | 2/2004 | Cheng et al. | 382/232 |
| 2004/0133548 A1 | 7/2004 | Fielding et al. | |
| 2004/0210607 A1 * | 10/2004 | Manchanda et al. | 707/203 |
| 2004/0260733 A1 | 12/2004 | Adelstein et al. | |
| 2005/0038787 A1 * | 2/2005 | Cheung et al. | 707/9 |
| 2005/0193005 A1 * | 9/2005 | Gates et al. | 707/104.1 |
| 2005/0273614 A1 | 12/2005 | Ahuja et al. | |
| 2006/0031938 A1 | 2/2006 | Choi | |
| 2006/0101069 A1 * | 5/2006 | Bell et al. | 707/103 R |
| 2006/0153296 A1 * | 7/2006 | Deng | 375/240.12 |
| 2006/0253423 A1 | 11/2006 | McLane et al. | |
| 2006/0253438 A1 | 11/2006 | Ren et al. | |
| 2006/0256739 A1 | 11/2006 | Seier et al. | |
| 2007/0074147 A1 | 3/2007 | Wold | |
| 2007/0085710 A1 | 4/2007 | Bousquet et al. | |
| 2007/0085711 A1 | 4/2007 | Bousquet et al. | |
| 2007/0253594 A1 * | 11/2007 | Lu et al. | 382/100 |
| 2007/0260643 A1 | 11/2007 | Borden et al. | |
| 2007/0276823 A1 | 11/2007 | Borden et al. | |
| 2007/0283158 A1 | 12/2007 | Danseglio | |
| 2007/0294271 A1 | 12/2007 | Bammi et al. | |
| 2008/0016569 A1 | 1/2008 | Hammer et al. | |
| 2008/0065811 A1 | 3/2008 | Jahangiri | |
| 2008/0163288 A1 * | 7/2008 | Ghosal et al. | 725/31 |
| 2008/0184338 A2 | 7/2008 | McCreight et al. | |
| 2008/0270373 A1 * | 10/2008 | Oostveen et al. | 707/5 |
| 2009/0216761 A1 * | 8/2009 | Raichelgauz et al. | 707/5 |
| 2011/0047130 A1 | 2/2011 | Kim et al. | |

OTHER PUBLICATIONS

Hines, Matt. Provilla to Fight Leaks with Document Fingerprints, www.eweek.com/article2/0.1985.2087164,00.asp, Ziff Davis Holdings Inc., May 12, 2008, 4 pgs.

* cited by examiner

AUTOMATED FORENSIC DOCUMENT SIGNATURES

RELATED APPLICATION

This application is a continuation-in-part of application Ser. No. 11/963,186, filed Dec. 21, 2007 now U.S. Pat. No. 8,280,905 and application Ser. No. 12/118,942 filed on May 12, 2008, now U.S. Pat. No. 8,312,023 the entirety of each of which is incorporated herein by reference.

FIELD OF THE INVENTION

This invention relates generally to methods and systems for computer data management and tracking. Specifically, it relates to methods and systems of digital data identification and the creation, storage, management, processing and comparison of content sensitive digital signatures.

BACKGROUND OF THE INVENTION

Over the last decade, the use of computers and the Internet has grown exponentially. Indeed, for many individuals, government agencies and private corporations it is an integral part of their daily lives and business practices. People can communicate, transfer information, engage in commerce and expand their educational opportunities with little more than a few key strokes and the click of a mouse. Like revolutionary technologies before it, the great advancement of computer systems, information technology and the Internet carries enormous potential both for advancement and for abuse. Unfortunately, criminals exploit these same technologies to commit crimes and harm the safety, security, and privacy of the society.

Although there are no exact figures on the cost of computer crimes in America, estimates run into the billions of dollars each year. The United States Federal Bureau of Investigation (FBI) has indicated that digital evidence has spread from a few types of investigations, such as hacking and child pornography, to virtually every investigative classification, including fraud, extortion, homicide, identity theft, and so on. Although there are as yet no definitive statistics on the scope of the problem, there is no doubt that the number of crimes involving computers and the Internet is rising dramatically. A survey conducted by the Computer Security Institute in 2007 revealed substantial increases in computer crime. About half (46%) of the companies and government agencies surveyed reported a security incident within the preceding twelve months. The reported total loss of the participants is $66,930,950. The average annual loss for each participant is $350,424 compared to $168,000 for the previous year. And unlike more traditional crimes, computer crime is especially difficult to investigate. Other criminal and terrorist acts and preparations leading to such acts, increasingly involve the use of computer systems and information technologies as well. These criminal and terrorist activities leave behind a trail of digital evidence. Digital evidence varies widely in formats and can include computer files, digital images, sound and videos, e-mail, instant messages, phone records, and so on. They are routinely gathered from seized hard drives, file servers, Internet data, mobile digital devices, digital cameras and numerous other digital sources that are growing steadily in sophistication and capacity.

Computer forensics is the practice of acquiring, preserving, analyzing, and reporting on data collected from a computer system, which can include personal computers, server computers, and portable electronic devices such as cellular phones, PDAs and other storage devices. Collecting and analyzing these types of data is usually called digital data identification. The goal of the process is to find evidence that supports or refutes some hypothesis regarding user activity on the system. When accurately and timely identified by a forensic investigator, digital evidence can provide the invaluable proof that helps the conviction of a criminal, or prevents a looming terrorist attack. A delay in identifying suspect data occasionally results in the dismissal of some criminal cases, where the evidence is not being produced in time for prosecution.

The amount of digital evidence is growing rapidly. Not only has the number of crimes involving digital evidence increased dramatically over time, but the total volume of data that is involved has increased at an even faster pace. This is the result of the increased presence of digital devices at crime scenes combined with a heightened awareness of digital evidence by investigators. Given the declining prices of digital storage media and the corresponding increases in sales of storage devices, the volume of digital information that investigators must deal with is likely to continue its meteoric increase.

A typical computer forensic process involves first the determination that the evidence requirements merit a forensic examination. Individuals who are expected to have access to that evidence are then identified. Further, all computer systems used by these individuals which might contain relevant data are located. Forensic images of those systems are taken, and analyzed for relevant evidence. Traditionally, a forensic investigator seizes all storage media, creates a drive image or duplicates it, and then conducts their examination of the data on the drive image or duplicate copy to preserve the original evidence. A "drive image" is an exact replica of the contents of a storage device, such as a hard disk, stored on a second storage device, such as a network server or another hard disk. One of the first steps in the examination process is to recover latent data such as deleted files, hidden data and fragments from unallocated file space. Digital forensic analysis tools used today are stand alone systems that are not coordinated with systems used by the forensic investigators and Information Technology (IT) staff. Current computer forensics analysis is largely a manual labor intensive process. It requires computer forensic investigators that have specialized training. The cost of the analysis is high. The rate for some computer forensic investigators can be more than $250/hour. It usually requires a long analysis time taking from days to weeks. Because it is a manual process, there is potential for human error resulting in missed data and missed discovery. In addition, when facing a complex investigation that involves a large number of computer systems, it is difficult to determine what systems to analyze. This may have two undesirable results: expending limited time and resources on useless systems, or missing systems that contain vital information.

The tremendous increase in data exacerbates these problems for forensic investigators. The number of pieces of digital media and their increasing size will push budgets, processing capability and physical storage space available to the forensic investigators to their limits. In an effort to reduce the volume of digital files for review, seized digital evidence is processed to reduce the amount of this data. Presently, there is no effective means to quickly sort through the amount of data based on the content of the data, and identify documents and files of interest for further detailed examination. Present solutions still require manual review from forensic investigators to identify specific data needed to prove guilt or innocence.

Government and business entities use sophisticated computers systems to store, track and disseminate information within the entity and communicate with outside individuals and entities. Information can be stored as files that exist on a computer file system, and can exist in many heterogeneous forms such as plain text documents, formatted documents (e.g. Microsoft Word® documents, Open Document Format documents), spread sheets, presentations, Portable Document Format documents, images of paper documents, graphics, sound recordings, videos, faxes, email messages, voice messages, web pages, and other stored digital media. Information can also be stored as entries in databases such as a relational database or a document management system. This information is subject to a wide range of user manipulations, such as create, edit, copy, rename, move, delete and backup. Information can also move among the entity computer systems through various communication means, such as emails, attachments, file sharing, shared file systems and push technology. Information can also leave the entity computer systems either by someone within the entity sending it to an outsider, or can be retrieved by an outsider from the entity computer systems by obtaining information containing removable storage media or through network access protocols such as HTTP, FTP, and peer-to-peer file sharing. All of this creation, manipulation, transfers, and communication of digital information can be part of the legitimate business process. However, abuse of the computer system also involves the same processes of creation, manipulation, transfer, and communication of information, albeit unauthorized or illegitimately. The Computer Security Institute 2007 survey also revealed that insider abuse of the network access or email edged out virus incidents as the most prevalent security problem. While a majority of all computer attacks enter via the Internet, the most significant of all dollar losses stem from internal intrusions.

The most important asset of many companies is their Intellectual Property (IP). Customer lists, customer credit card lists, copyrights including computer code, confidential product designs, proprietary information such as new products in development, and trade secrets are all forms of IP that can be used against the company by its competitors. Common risks for a corporation may be theft of trade secrets and other privileged information, theft of customer or partner information, disclosure of confidential information, and disclosure of trade secrets and other valuable information (designs, formulas etc.).

Corporations may also incur liability or exposure to risks when unauthorized contents are stored in the computer systems, such as child pornographic material, or pirated copies of media or software. An organization must know which of its assets require protection and the real and perceived threats against them.

Current information security builds layers of firewalls and content security at the network perimeter, and utilizes permissions and identity management to control access by trusted insiders to digital assets, such as business transactions, data warehouses and files. This structure lulls the business managers into a false sense of security. Many employees are restricted in their access to sensitive data, but access control is usually not easily fine tuned to accommodate the ever changing assignments and business needs of all the employees. Moreover, as is necessary to perform their function, Information Technology (IT) employees have access to sensitive data and processes. Indeed, IT employees are the custodians and authors of those objects. This may place them in positions to reveal information to others that will damage the company or directly sabotage a company's operations in various ways. IT employees who are disgruntled, angry, or seeking to steal information for profitable gain, may attempt to steal sensitive digital information which could lead to substantial losses for the organization. A laid-off employee is a prime source of potential leakage of such information.

Content-security tools based on HTTP/SMTP proxies are used against viruses and spam. However, these tools weren't designed for intrusion prevention. They don't inspect internal traffic; they scan only authorized e-mail channels. They rely on file-specific content recognition and have scalability and maintenance issues. When content security tools don't fit, they are ineffective. Relying on permissions and identity management is like running a retail store that screens you coming in but doesn't put magnetic tags on the clothes to prevent you from wearing that expensive hat going out.

A hash analysis is a method that can be used for comparing the content of digital evidence. A cryptographic one-way hash (or "hash" for short) can be a way to calculate a digital fingerprint: a very large number that often uniquely identifies a digital file. A hash is a calculated function on the bits that make up a file. Therefore, two files with different names but the exact same contents will produce the same hash. However, using hash systems to identify conclusive or known suspect files faces several challenges. By design of the hash function, a small difference, even a single bit, in the input file will generate a significantly different output hash. The difference between two hash numbers does not reflect the level of similarity of the input files. The hash method cannot be used to identify files that have been altered, whether minimally or substantially. They are therefore not able to identify derivative files, files that contain common contents but are arranged or formatted differently or contain more or less other content. For the same reason, hash analysis is not effective against multimedia files (image, video, and sound). As a consequence, an individual using these files to commit crimes may escape hash based detection and prosecution.

It would be beneficial and desirable to integrate newer, advanced technologies to automate the detection and classification process for suspect files and identify related altered or derivative files. This would allow forensic investigators to focus on identifying relevant data during the forensic process and addresses many of the problems of efficiency, cost and delay facing digital forensic examinations today. There is also a need for a technology to scan and manage digital data on a computer system based on the content of the data. There is a further need for a solution to allow government agencies and corporations to automatically monitor and prevent unauthorized use or exchange of classified or proprietary data.

SUMMARY OF THE INVENTION

The present invention is a method, system, and computer readable media for proactively generating, preserving and comparing computer forensic evidence for a computer system. The method involves generating at least one signature for at least one target based on the content of the target. The at least one signature can be generated at any time, or when a predetermined operation is commenced. The at least one generated signature can be stored, or not, prior to or after forensic use. The generated signature(s) are compared with one or more previously generated signature(s) to determine whether any compared signatures have similarities above a predetermined threshold. Alternatively, the present invention could, at any time, simply compare previously existing signatures generated from a target.

The target can be any file, any file that is owned by a user, any operating system file, any file that is part of a proprietary information system, or any file that is related to a network intrusion attack. When the target is any type of file, the predetermined operation can be any one or more of creating, deleting, renaming, editing, moving, updating, linking, merging, modifying and copying the file. The target could also be a database entry; and when a database entry, the predetermined operation can be any one or more of selecting, inserting, updating, deleting, merging, beginning work, committing, rollback, creating, dropping, truncating, and altering of the database entry. The target can further be a database definition. When the target is a database definition, the predetermined operation can be any one or more of creating, dropping and altering the database definition.

The target can also be network traffic; and when network traffic, the predetermined operation can be the occurrence of network traffic entering a network or leaving a network, or a network traffic is initiated from a computer system, or a computer system receives network traffic. The network traffic may be any one or more of a signal protocol, an email, an attachment of an email, an instant message conversation, a text message, a remote login, a virtual private network, a viewed webpage, a file transfer and file sharing.

Generating the at least one signature can involve extracting a set of tokens from the at least one target, processing the set of tokens, generating a fingerprint from the set of tokens, and generating the signature for the target by combining the fingerprints with other related information of the target. Processing the set of tokens can include sorting the set of tokens, and may further include filtering the set of tokens. The method for generating the fingerprints may involve a hash method, or an implementation of a bit vector method.

Other related information of the target can be accessible by an operating system, and can be any one or more of file name, date of record, time of record, user or owner information, network address, network protocol, access history and fingerprint history. Other related information of the target could also be information accessible by an application.

The generated signature(s) could be stored in a manner preventing deletion or modification by a user, other than a user with special access rights, such authorized personnel or a forensic investigator. The signature(s) could further be made available only to authorized personnel or a forensic investigator with access rights. The signature(s) and respective targets can be stored on the same computer system, different computer systems, and/or on a shared file system. Finally, the signature(s) can be stored on write-once, read-many media.

In another aspect of the present invention, a computer readable medium is provided that configures a computer system to perform the methods described above of proactively generating, preserving and comparing computer forensic evidence for a computer system. In summary, computer readable medium facilitates the method of generating at least one signature for at least one target based on the content of the target; and comparing the at least one generated signature with at least one previously generated signature to determine whether the signatures have similarities above a predetermined threshold.

In a further aspect of the present invention, the present invention also provides an apparatus for the generation, preservation and comparison of computer forensic evidence. The apparatus/system can include a processor arranged to generate at least one signature for at least one target based on the content of the target, and a comparator configured to compare the at least one generated signature with at least one previously generated signature to determine whether the signatures have similarities above a predetermined threshold. In addition, the system can additionally include an extension module configured to trigger signature generation upon occurrence of a certain action, and a mechanism for storing the generated signatures. The implemented system may have an operating system service (e.g., a Windows® service or Unix/Linux daemon) running in the background to generate a signature for a given file and to store it, and then to query the stored signatures to determine similarity with other signatures.

In another aspect of the present invention, a computerized method of proactively generating and querying computer forensic evidence for a computer system is provide. The method comprises the steps of generating a representation of content of at least one target within a set of targets, and generating an inverted index of the set of targets, wherein the inverted index is associated with representations of the content of each target of the set of targets.

In one aspect of the present invention, the set of targets comprises one or more files. According to some embodiments of the present invention, the inverted index is updated upon occurrence of a predetermined operation, and the predetermined operation is one or more of creating, deleting, renaming, editing, moving, updating, linking, merging, modifying and copying a file.

In another aspect of the present invention, the set of targets comprises one or more database entries. According to some embodiments of the present invention, the inverted index is updated upon occurrence of a predetermined operation, and the predetermined operation is one or more of select, insert, update, delete, merge, begin work, commit, rollback, create, drop, truncate, and alter of a database entry.

According to one aspect of the present invention, generating the representation of the content of at least one target comprises the steps of extracting a set of terms from the target, and processing the set of terms.

According to another aspect of the present invention, generating the representation of the content of at least one target further comprises the steps of extracting other related information of the target, and incorporating the other related information with the extracted and processed terms.

In some embodiments of the present invention, the other related information of the target is accessible by an operating system, and is at least one of file name, date of record, time of record, user or owner information, network address, network protocol, and access history of the target.

In some other embodiments of the present invention, the other related information of the target is accessible by an application.

According to one aspect of the present invention, generating the inverted index of the set of targets comprises the steps of extracting a set of terms from the at least one target, processing the set of terms, indexing the set of terms to create the inverted index and associating the set of terms with representations of the content of each of the one or more targets.

In some embodiments of the present invention, the representation of the content of the at least one target is stored permanently and is not removed when the target is modified or removed.

In some other embodiments of the present invention, the inverted index retains association with the representation of the content of the at least one target when the target is modified or removed.

In yet another aspect of the present invention, the method further comprises the step of storing the generated inverted index in a manner preventing deletion or modification of the inverted index by a user other than authorized personnel or a forensic investigator.

According to one aspect of the present invention, the generated inverted index is available only to authorized personnel or a forensic investigator with access rights.

According to another aspect of the present invention, the generated inverted index and the set of targets are stored on the same computer system.

According to yet another aspect of the present invention, the generated inverted index is stored on a first computer system and the set of targets is stored on a second computer system accessible to the first computer system through a computer network.

The present invention, in yet another aspect, further comprising the step of querying the inverted index.

In one aspect of the present invention, a computer-readable medium that configures a computer system to perform a method of proactively generating and comparing computer forensic evidence for a computer system is provided. The method comprises the steps of generating a representation of content of at least one target within a set of targets, and generating an inverted index of the set of targets, wherein the inverted index is associated with representations of the content of each target of the set of targets.

In another aspect of the present invention, an apparatus for proactively generating and comparing computer forensic evidence is provided. The apparatus comprises a processor arranged to generate a representation of content of at least one target within a set of targets, and a processor arranged to generate an inverted index of the set of targets, wherein the inverted index is associated with representations of the content of each target of the set of targets.

In another aspect of the present invention, a method of generating a signature of a video is provided. The method comprises the steps of detecting scene changes of the video, segmenting the video into a plurality of segments corresponding to each scene change, extracting a representation from each segment, forming a digital fingerprint based on the representation, and creating a signature by combining the digital fingerprint with predetermined metadata of the video.

According to another aspect of the present invention, the representation includes one or more frames of each segment.

According to another aspect of the invention, the representation includes length information of each segment.

According to another aspect of the invention, the representation includes a subtitle and caption text of each segment.

In another aspect of the present invention, a method of generating a signature for an audio file is provided. The method comprises the steps of determining whether the audio includes music or speech, generating, if the audio includes speech, a transcript of the speech, extracting a representation from the transcript, forming a digital fingerprint based on the representation, and creating a signature by combining the digital fingerprint with predetermined metadata of the audio.

In another aspect of the present invention, a method of generating a signature of a digital file is provided. The method comprises the steps of selecting a token indicating an informational object, generating a digital fingerprint of the digital file using the selected token, and creating the signature that includes the digital fingerprint and meta data of the digital file.

According to another aspect of the present invention, the method further comprises the steps of extracting a plurality of tokens from the digital file according to the selected token, and inserting the extracted plurality of tokens into a data structure that probabilistically determines whether a token is inserted before.

According to another aspect of the present invention, the selected token includes a token selected from the group consisting essentially of: an email address, a name, an account number, and a social security number.

In another aspect of the present invention, a method of matching a forensic signature of a digital file is provided, comprising the steps of receiving, by a master apparatus, a list of query signatures, generating, by the master apparatus, a plurality of sub-lists of query signatures, transmitting, by the master apparatus, a sub-list to a slave apparatus, matching, by a slave apparatus, the query signatures with signatures in database according to digital fingerprints included in the query signatures and generating a plurality of matching lists for each digital fingerprints, merging, by the slave apparatus, the plurality of matching lists and generating a final list, calculating, by the slave apparatus, a score for each matched signature in the final list according to a closeness between the matched signature and the query signature, and transmitting, by the slave apparatus, the final list and the score to the master apparatus.

DETAILED DESCRIPTION

Example Computing Environment

Figure 1:
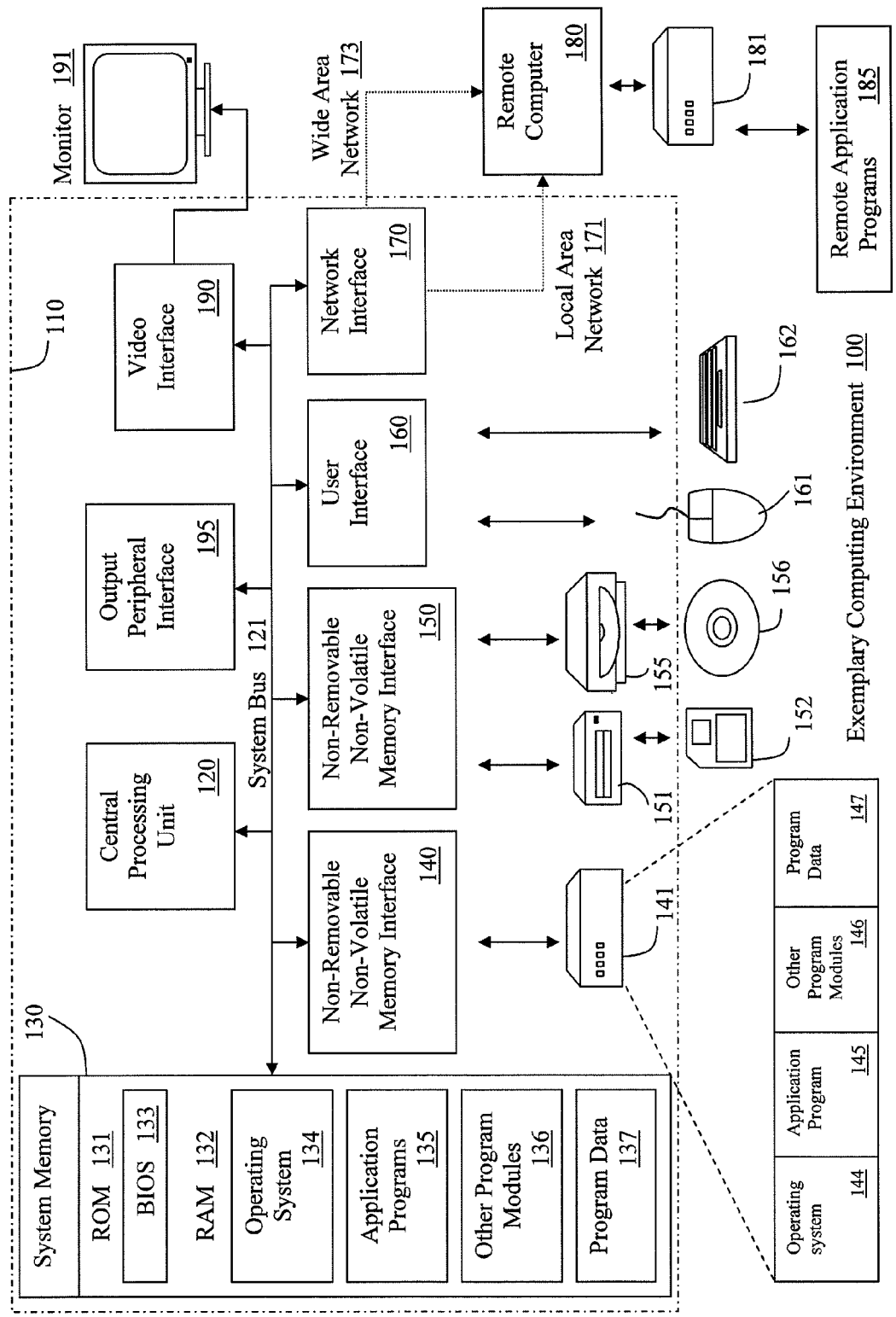
FIG. 1 is a schematic diagram of an exemplary computing environment.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or a combination of components illustrated in the exemplary operating environment 100.

With reference to FIG. 1, an example system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

The computer 110 typically includes a variety of computer readable media. Computer readable media can be any available media that can be accessed by the computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers and a printer (not shown), which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes means for establishing communications over the WAN 173, such as the Internet. In a networked environment, program modules depicted relative to the computer 110, or portions thereof, may be stored in the remote memory storage device. By way of example, and not limitation, FIG. 1 illustrates remote application programs 185 as residing on a memory device 181. Remote application programs 185 include, but are not limited to web server applications such as Microsoft® Internet Information Services (IIS)® and Apache HTTP Server which provides content which resides on the remote storage device 181 or other accessible storage device to the World Wide Web. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Network Environment

Figure 2:
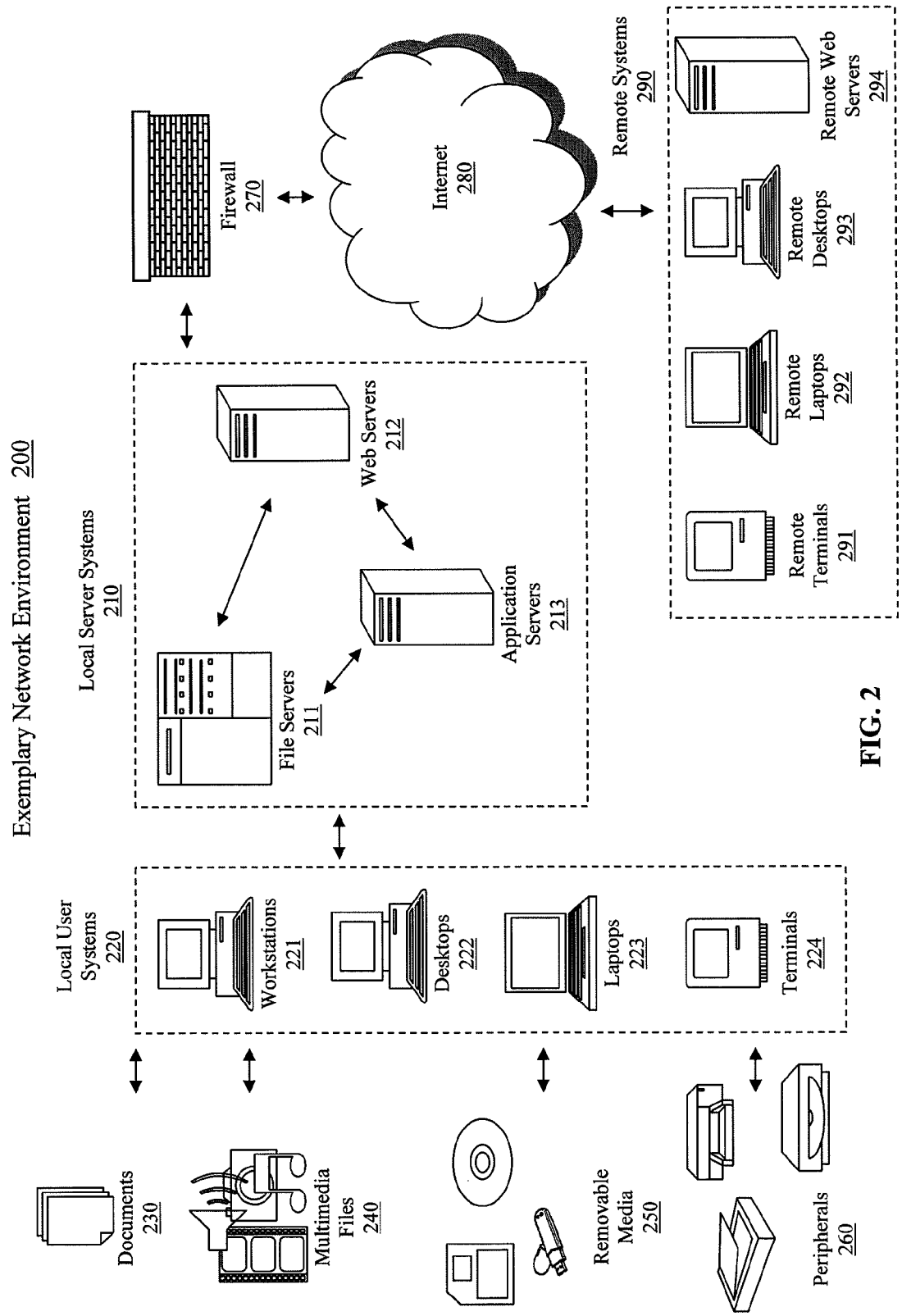
FIG. 2 is a schematic diagram of an exemplary network environment.

FIG. 2 illustrates an embodiment of a network environment in which an embodiment of the present invention can be implemented. The network environment 200 contains a number of local server systems 210, which may include a number of file servers 211, web servers 212, and application servers 213 that are owned and managed by the owner of the local network. These servers are in communication with local user systems 220 which may include a large variety of systems such as workstations 221, desktop computers 222, laptop computers 223, and thin clients or terminals 224. The local user systems 220 may contain their own persistent storage devices such as in the case of workstations 221, desktop computers 222, and laptop computers 223. They can also have access to the persistent storage provide by the local servers 210. In the case of thin clients and terminals 224, network storage may be the only available persistent storage. The local user systems are usually connected to a variety of peripherals 260 that handle data input and output, such as scanners, printers and optical drives. There may also be a number of different kinds of removable media 250 that attach to the user systems 220 at times. These removable media 250 can be based on magnetic recording, such as floppy disks and portable hard drives, or be based on optical recording, such as compact disks or digital video disks. Further, removable media can also be based on non-volatile memory such as flash memory which can be a USB flash drive, and all forms of flash memory cards. The users within the local network usually get access to the wider area network such as the Internet 280 though the local server systems 210 and typically some network security measures such as a firewall 270. There might also be a number of remote systems 290 that can be in communication with the local server systems 210 and also the local user systems 220. The remote computer systems can be a variety of remote terminals 291, remote laptops 292, remote desktops 293, and remote web servers 294.

FIG. 2 illustrates an exemplary network environment. Those of ordinary skill in the art will appreciate that the teachings of the present invention can be used with any number of network environments and network configurations.

The Present Invention

The present invention teaches methods and systems to improve computer forensics with search and machine learning. This invention allows organizations that anticipate the need for forensic analysis to prepare in advance by keeping small amounts of information about any content on computer systems, such as files, database entries or schema, or network traffic, as the content is created, deleted, modified, copied or transmitted or received. Computational and storage costs are expanded in advance, which allows faster, better and less expensive computer forensics investigations.

The present invention provides a novel proactive approach for computer forensic investigations. For any type of content that is created, deleted, modified, copied, transmitted or received, a small amount of information about the content, called a signature, is created and stored away. A signature contains one or more fingerprints and other information associated with the target. A fingerprint is a relatively small number of bits, as compared to the size of the file that is computed based on the content of a target. The target can be any file, any file that is owned by a user, any operating system file, any file that is part of a proprietary information system, any file that is related to a network intrusion attack, any database entry or definition, or network traffic. For a text file, for example, a signature contains one or more fingerprints computed based on the content of the file along with other information associated with the file, such as the file name, date and time of record, user/owner information, and fingerprint history. For a database entry or definition, the signature contains one or more fingerprints that are calculated based on the content of the database entry or definition along with other information associated with the database entry or definition. For network traffic, the signature contains one or more fingerprints that are calculated based on the content of the network traffic and along with other information associated with the network traffic, such as time and date information, sender and recipient network addresses, and network protocol.

The fingerprints of the present invention are digital digests of the content of a target. In the hash method, all bits that make up a file are considered as the content of a file. In the present invention, however, the content of a target is defined and represented by selections of tokens that are logically selected from the target. As an example, the content of a target that contains textual information can be defined by a selection of words and phrases within the target. For targets that lack a semantic meaning, idiosyncratic characteristics of the target can be identified and used to represent the contents. Fingerprints are small, taking up a small amount of storage space, when compared to the original content of the target. Fingerprints are also easy to compute, and can identify a file, a database entry or definition, or network traffic by its content as defined by the list of selected tokens. Fingerprints can accommodate small modifications of the file (e.g., small edits or reformatting of a file may not alter its fingerprint). The fingerprints of a minimally edited version of a file mostly or fully match the fingerprints of the original file.

The creation of a signature usually comprises four steps. First, a set of tokens of interest are extracted from a target, such as a file, database entry or definition, or network traffic. Second, the token set undergoes a predetermined sequence of processing, such as sorting and filtering. Third, a fingerprint is then generated for each retained token set. Lastly, the fingerprint is combined with other information associated with the target file, database entry or definition, or network traffic to generate a signature.

Using a document that contains text information as an example, the first step involves parsing the document, extracting text information and retaining tokens of interest. Tokens of interest may include, but are not limited to, all words, phrases, selective parts of speech, e.g., nouns (names, places, etc.), words longer than a fixed number of characters, words not found in a dictionary, words found within a certain set of predefined lists of words, words of a "foreign nature", words based on inverse document frequencies (histograms), in other words, words based on collection statistics, and acronyms.

Processing the token set may involve sorting the token set, and may further include filtering the token set. Sorting the token set can be based on, but not limited to, Unicode (alphabetical) ordering, biased weighting on inverse document frequency, and phrase or word length. Filtering the token set and retaining a subset of the tokens can be based on, but not limited to, rules such as selecting the top X % of the tokens, (i.e., X>=T1); or middle tokens, (i.e., T2>=X>=T1; or bottom tokens, i.e., X<=T2); or selective sets of tokens, (i.e., every t tokens, e.g., third, seventh, etc.); or no filtration at all, namely retaining all tokens. The retained tokens may be sorted again as previously described. However, sorting is unnecessary if one wishes to retain the same sorting conditions as used previously.

Creating one or more fingerprints of the retained token list can follow several computational methods. For example, a hash based method, where using a hash function, one can encode the sorted list of retained tokens and generate a unique hash for the retained token list. Many popular hash functions can be used for the calculation of the hash, such as MD5, SHA-1, RIPMED, WIRLPOOL, and the variations of these hash functions. Using a hash method for fingerprint creation is advantageous as it calculates quickly, and saves space. However, hash methods are not reversible (i.e., given a hash code, it is computationally impractical to retrieve the original token list).

Another method for fingerprint creation is a bit vector method, which uses a bit vector to encode the presence or absence of retained tokens. The bit vector could be a binary vector using a sequence of Boolean values, each stored as a single bit, or a non-binary numeric vector. The advantage of the bit vector method is that it is a reversible process, but bit vectors are often more costly in terms of storage space.

The creation of fingerprints is generally some form of lossy compression based on a predefined operation. However, it is within the scope of the invention to use a lossless compression method. For multimedia content, such as an image, sound and/or video file, mathematical transformations can be used to create fingerprints. It is apparent to those skilled in the art that fingerprint creation can be achieved through a variety of methods, and are not limited to the above mentioned approaches. Once the fingerprints are created, other information associated with the document is extracted and combined with the fingerprints to create a signature. The other associated information may be information about the document that is accessible through the operating system, which may include, but is not limited to, file name, date and time of record, user/owner information, access history, and fingerprint history. Other information may also include information about the document accessible through an application, which may include, but not limited to, author, time of editing, number words, title, subject, comments, and any other customizable fields or application specific information. There are numerous possibilities regarding the information that can be incorporated into a signature. A person skilled in the art could choose to incorporate any number of desired attributes of the target into a signature, depending on the specific implementation.

Figure 3:
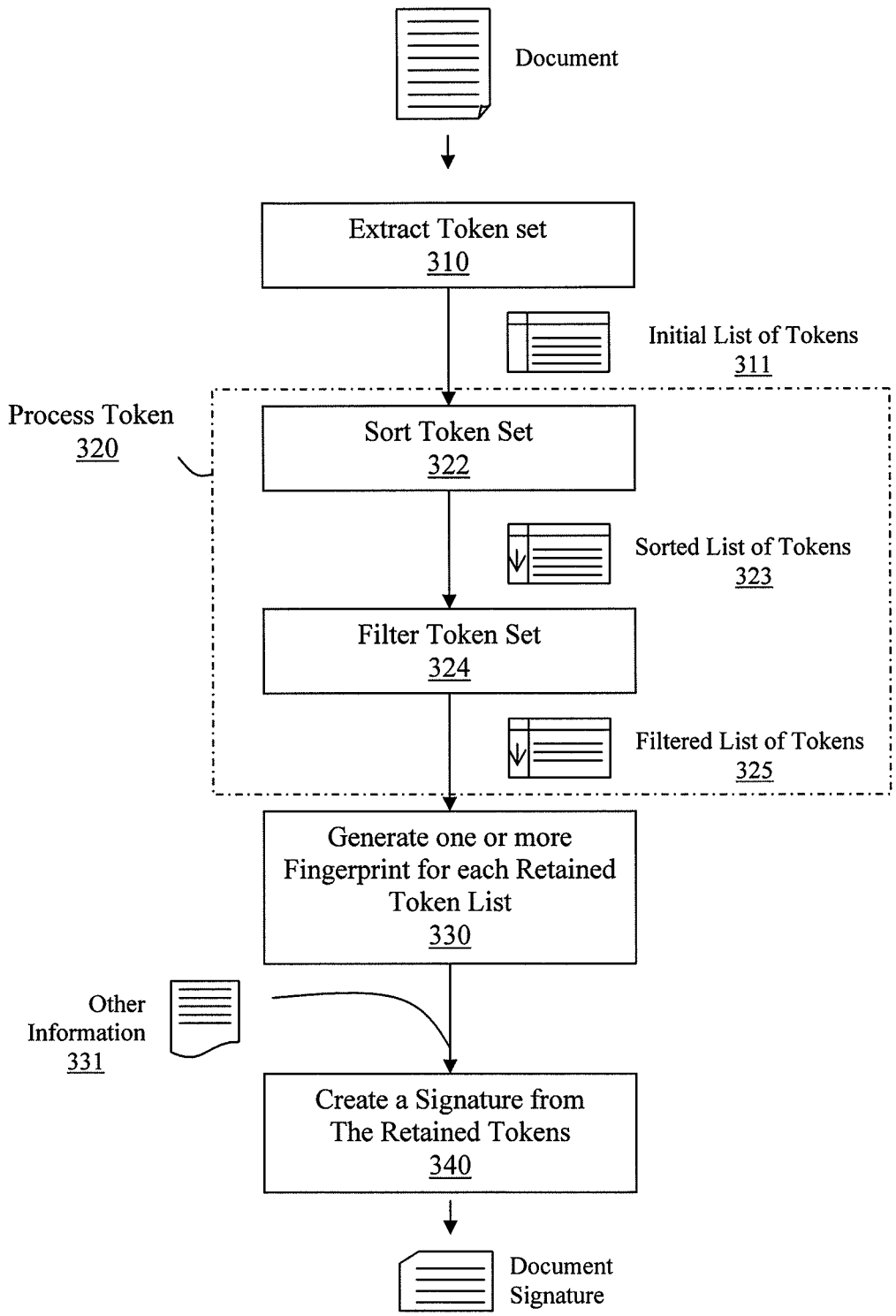
FIG. 3 is a flow chart illustrating an exemplary method for generating a signature for a document.

FIG. 3 shows an exemplary diagram of the process of generating a signature for a document. The document is first parsed and non-textual information is removed. A set of tokens 311 are extracted 310 from the document. One ordinarily skilled in the art would appreciate that there are a number of other acceptable ways to perform the extraction of the token list. The token set is then processed to yield a unique token list. In the FIG. 3 embodiment, the processing of the token set involves sorting the token set 320, which produces a sorted list of tokens 323, and filtering the token set 324, which generates one or more filtered lists of tokens 325. One ordinarily skilled in the art would appreciate that there are a number of other acceptable ways to perform the processing of the token set. The retained tokens are then used to generate one or more fingerprints of the document 330. In one embodiment of the invention, a hash or bit vector can be calculated for the entire list of retained tokens and used as a fingerprint. In another embodiment of the invention, the processed token list can be presented in the form of several subsets of tokens. A hash or bit vector can be calculated for each of the subset of tokens, and the document is represented with a list of fingerprints corresponding to each retained subset of tokens. In yet another embodiment of the invention, a hash or bit vector is calculated for each retained token, and the document is represented with a list of fingerprints corresponding to each retained token. A signature is created 340 by combining other information associated with the document 331 with one or more fingerprints. The resulting signature is then stored.

When a document is modified, if the modification is small, the fingerprint of the file might not change, and the signature is updated with relevant other information. If modifications to a document are not small, then the modified document's fingerprint may not be sufficiently close to the original fingerprint. After such modification, a new candidate fingerprint is created and compared to the original fingerprint. If sufficient change has occurred in the document, and the candidate fingerprint does not match the original fingerprint, the new candidate fingerprint is added to the document's signature. The signature may encode other information, including but not limited to information related to derivation. In other embodiments of the invention, similarity may be measured by comparing fingerprints, signatures or both.

Figure 4:
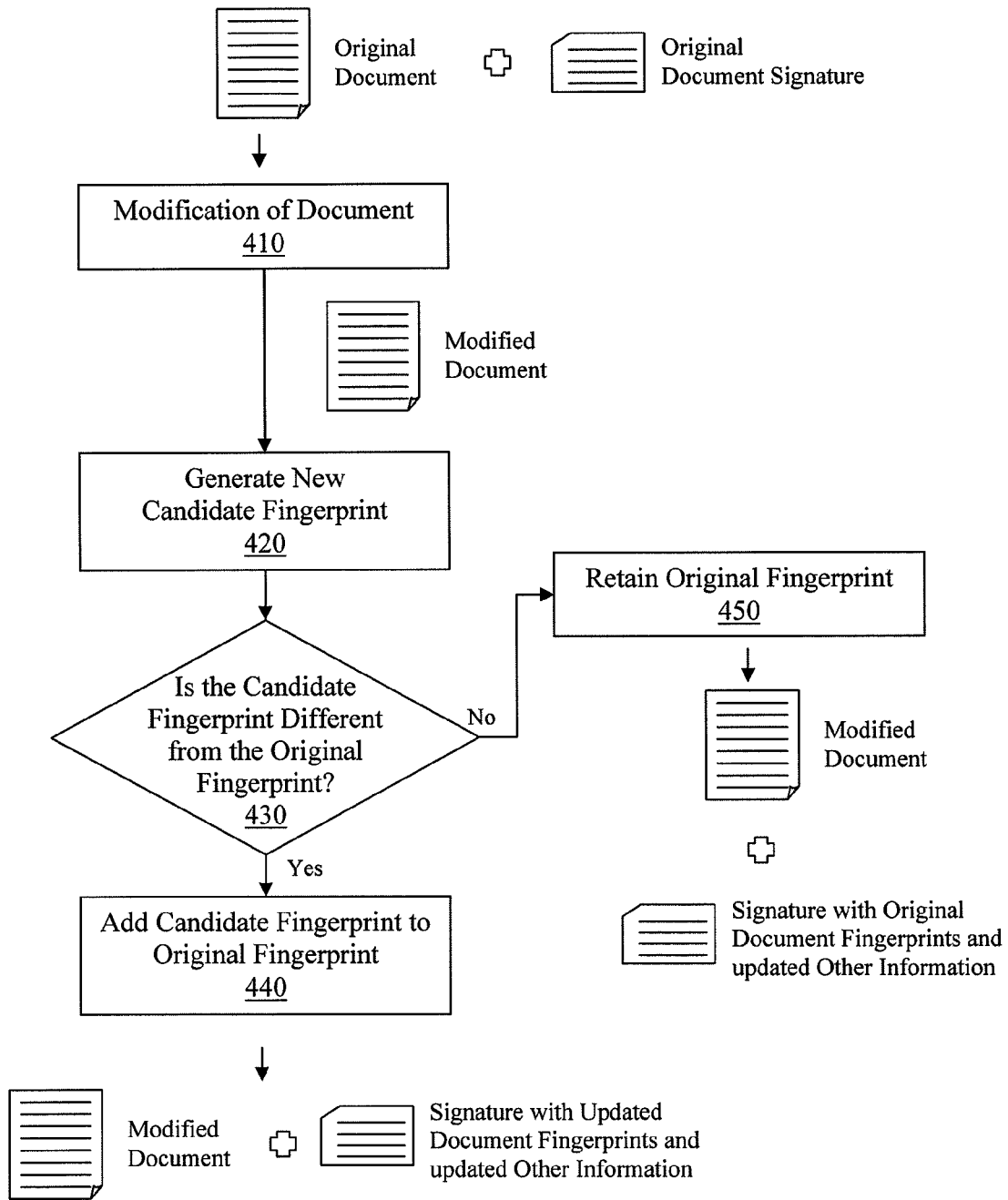
FIG. 4 is a flow chart illustrating document modification and new fingerprint generation pursuant to one embodiment of the present invention.

FIG. 4 illustrates document modification and further fingerprint generation. When a document is modified 410, a new candidate fingerprint is generated 420 based on the content of the modified document using the method exemplified in FIG. 3. The new candidate fingerprint is then compared with the fingerprint representing the original version of the document 430. The actual original document does not need to be retrieved for comparison. If the candidate fingerprint does not differ from the original document, the modification of the document is minor. The original fingerprint is then combined with updated other information associated with the document 450 and the updated signature is stored. If the candidate fingerprint differs from the original document, a major modification has occurred. The candidate fingerprint is then added to the original fingerprint 440. A new signature of the modified document is then created, incorporating the updated other information of the document and stored. If a fingerprint history is implemented in the signature, it is also updated.

The present invention can easily be adapted to other types of files. It is also possible to construct similar fingerprints for multimedia files such as image, video, and sound files. A variety of mathematical transformations can be used to create fingerprints for these file types, such as Laplace transform, Karhunen-Loève transform and Fourier transform. Metadata text of sound, image, and video can be used to generate fingerprints. Close captioning within a video file is text which can be used to generate fingerprints, as previously described. Speech can be converted to text using existing software tools. Text thus derived can be used to generate fingerprints. Moreover, the digital content of these files can be encoded as a sequence of tokens, like text documents. Executables and dynamically linked libraries (DLL) can be represented as a sequence of tokens, which can be used to produce fingerprints. Text embedded in these files can also be used to create fingerprints. Reverse engineered programs (e.g., Java) can be treated as text. Byte-code languages and scripting languages (e.g., Perl, python) can also be treated as text. The fingerprint creation process produces a relatively small amount of bits, as compared to the original file, and serves as a digest of the content of the original file. A person skilled in the art will appreciate that numerous methods can be used for achieving fingerprint creation. The fingerprint creation process in general is a lossy compression process. However, lossless compression schemes can also be adopted for the fingerprint creation process.

The signatures are stored in a manner preventing a regular user from modifying or deleting the signatures. Because the signatures are used for forensic purposes, their generation and storage is preferably transparent to the regular user. Only authorized personnel and forensic investigators can have access to the stored signatures. In a network environment, signatures can be created on a user system and offloaded to a network server for storage. Signatures can also be stored on a local file system, while denying user access through use of hidden files or hidden partitions. The signatures can also be embedded in encrypted files. One can also use write-once, read-many media for storing signatures. Only authorized personnel or forensic investigators can recover the storage media and be responsible for safe keeping. Off site storage of the signatures may also be desirable. Cryptographic logging mechanisms can be implemented to control and monitor the access of the signatures.

The present invention can be implemented in a variety of ways. In a stand alone system, such as an individual PC, laptop, mobile device (e.g., cell phone, PDA, etc.), signature information is stored locally. In a system that has access to shared file systems, such as file servers, database servers, and network attached storage (NAS), signature information is stored locally or on the shared file systems. In a network based implementation, any system with a network connection can have signature information stored on remote servers. One skilled in the art will appreciate that signatures can be stored in a variety of ways depending on the system or the network configurations of a particular environment.

Fingerprints can be created for information that is stored in any database and also database definitions. Signatures for each database entry are based on content and can be created for the entire database. As an example, signatures can be created for emails stored within a server database, allowing the tracing of email senders and receivers. Database definitions, such as schema, relations, tables, keys, and data domains can also have signatures created. When a data manipulation or definition event occurs, such as create table, drop table, or alter table, a new signature is created and stored.

In addition to files, signatures can be created for other applications. Changes to virtual machine file systems could be indexed as changes occur. Contents of removable media could have signatures created during mounting or un-mounting (during connection and disconnection) to a computer system. Compressed or archived files could be parsed and have signatures created.

It can also be useful to create and store signatures for network traffic. For example, signatures can be created for emails entering and exiting a network. Email attachments can have separate signatures created. Network traffic can thus be linked to particular emails and files when stored. Contents of instant message conversations and contents of file transfers can also be used to create signatures for the particular network activity. Signatures can also be created for text messages such as the ones based on Short Message Service (SMS) protocol. Web pages can also have signatures generated. When integrated over time, a digest or profile of one or more user's Internet browsing history can be generated. A person skilled in the art will appreciate that any information or signal transmitting protocol can be used as a target for signature creation. In one embodiment of the invention, a proxy firewall is used, and signatures are created of network traffic passing through. Network policies can be configured so that the network traffic passing through the proxy firewall is not encrypted. When so configured, secure connections are established between an inside user computer to the proxy firewall, and the proxy firewall to an outside server using an encryption protocol such as Transport Layer Security (TLS) or Secure Sockets Layer (SSL). Network traffic encryption only occurs between the inside user computer and the proxy firewall, and between the proxy firewall and the outside server. Contents passing through the proxy firewall are not encrypted and can, therefore, have signatures created. Signatures are stored among other information associated information regarding the network traffic with IP addresses used in communication, therefore facilitating the identification of the origin and destination of the traffic.

Once signatures are stored, there are a variety of methods to analyze them. Similarity between signatures can be ascertained by comparing the signature or the fingerprints for exact matching, percentage of matching, probability of matching, or other mathematical calculation revealing the divergence of the signatures or fingerprints. In one embodiment of the invention, a latent analysis can be performed. Particular signatures and/or fingerprints on individual machines locally or remotely can be searched and compared. Signatures or fingerprints that are stored in a database can be similarly searched. In another embodiment of the invention, an active analysis is performed. Instead of simply searching with signatures and fingerprints, advance or retrospective analysis of the signatures and fingerprints can be performed for the purpose of data mining, user profiling, trend analysis, and anomaly detection.

Figure 5:
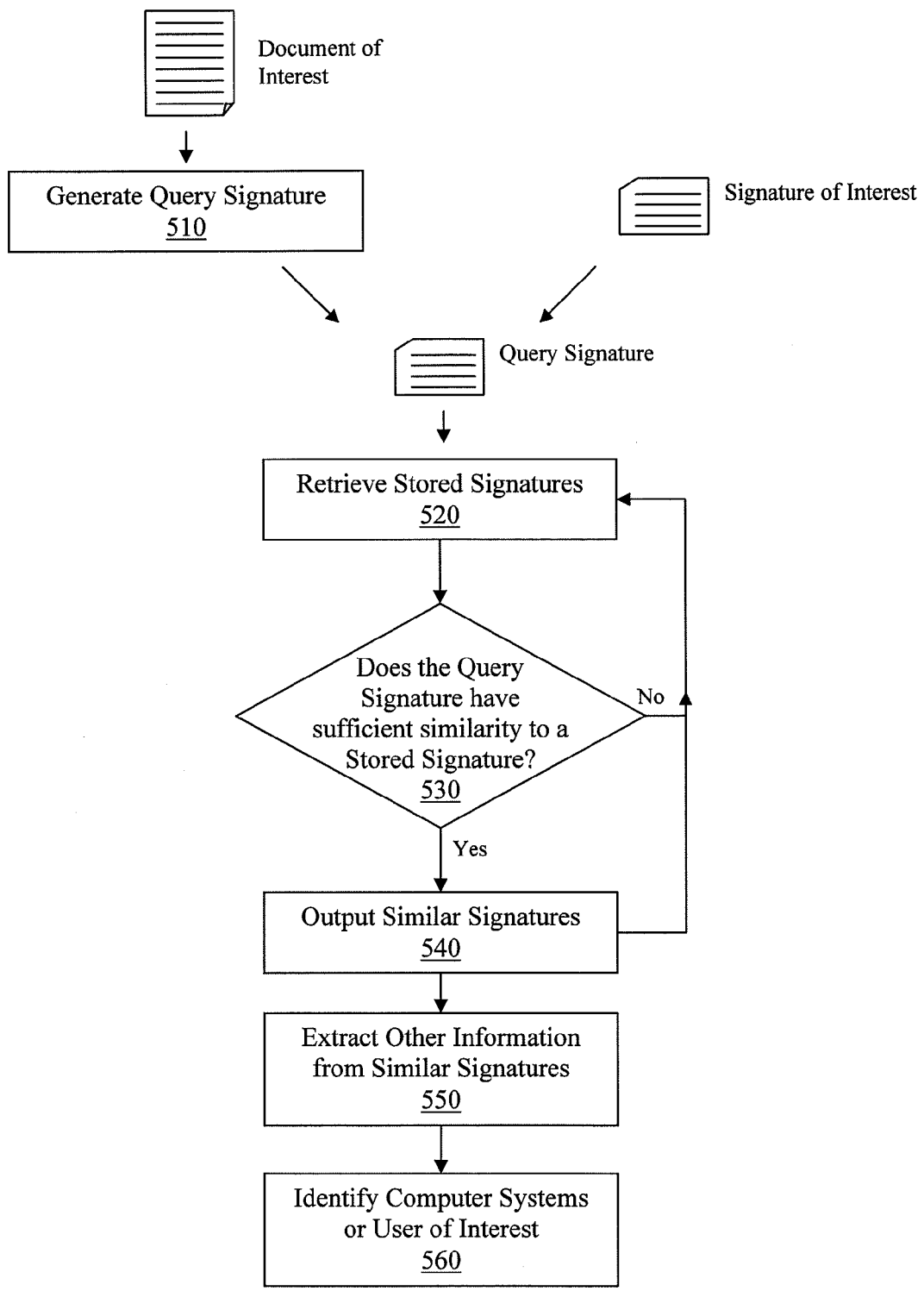
FIG. 5 is a flow chart illustrating an exemplary method to perform a latent signature search.

FIG. 5 presents an exemplary method for performing a latent search. When provided with a signature of interest, the signature can then be used directly as a query signature. Where a document of interest is provided, a query signature can be created 510 using the method exemplified in FIG. 3. Stored signatures are then retrieved from storage 520 and compared to the query signature 530. The comparison can be performed on signatures, the fingerprints within the signatures, or both. Similarity of the query signature to any stored signature is then determined. If the fingerprints are calculated using a hash method, the similarity is estimated based on hash matches. If the fingerprints are calculated using a bit vector method, the similarity is estimated based on bit vector correlation. If the comparison identifies any stored signatures having similarity above a predetermined threshold, the similar signatures are output for further processing 540. Other information within the stored signatures similar to the query signature is extracted 550. Other documents containing content similar to the document of interest, computer systems housing the document of interest or any similar documents, and users that had possession of the document of interest or any similar documents, can all be identified 560.

Figure 6:
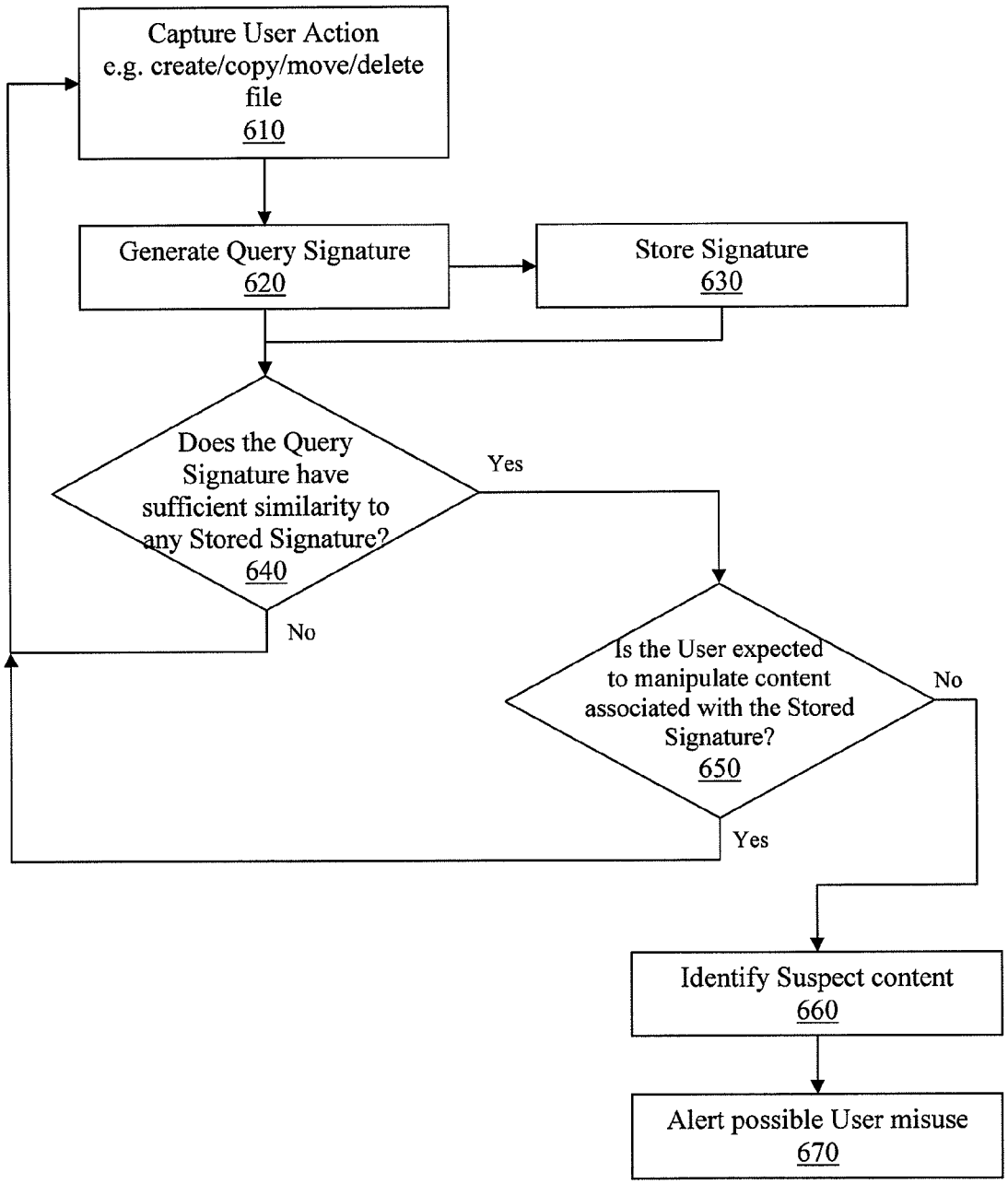
FIG. 6 is a flow chart illustrating an exemplary method for user misuse detection.

FIG. 6 presents an exemplary method for user misuse detection. When a user performs an operation to a document that is within a list of predetermined operations, such as create, modify, copy, move, or delete a document, the system captures this user operation 610, and a new signature is created 620 and stored 630. This new signature is then used as a query signature, and compared with stored signatures 640. In one embodiment of the invention, a subset of all stored signatures, such as signatures of known documents containing classified or sensitive information, or illegal content can be used. If the comparison does not identify any stored signature within this subset having similarity to the query signature above a certain threshold, the user is presumably not manipulating classified, sensitive, or illegal content. No action needs to be taken, the operation proceeds as normal. If the comparison identifies any stored signature within this subset that has similarity to the query signature above a certain threshold, the user is presumed to be manipulating classified, sensitive, or illegal content. A further inquiry whether the user is expected to manipulate such content is performed 650 based on criteria such as security clearance, job assignment, or special permission. If the user is determined to have proper access permission, and is expected to manipulate such content, the operation proceeds as normal. However, if the user does not have proper permission, or is not expected to manipulate such content, then the suspect content is identified based on the query and the stored similar fingerprint or signature 660, and a misuse alert is sent to authorized personnel or a forensic investigator 670.

Figure 7:
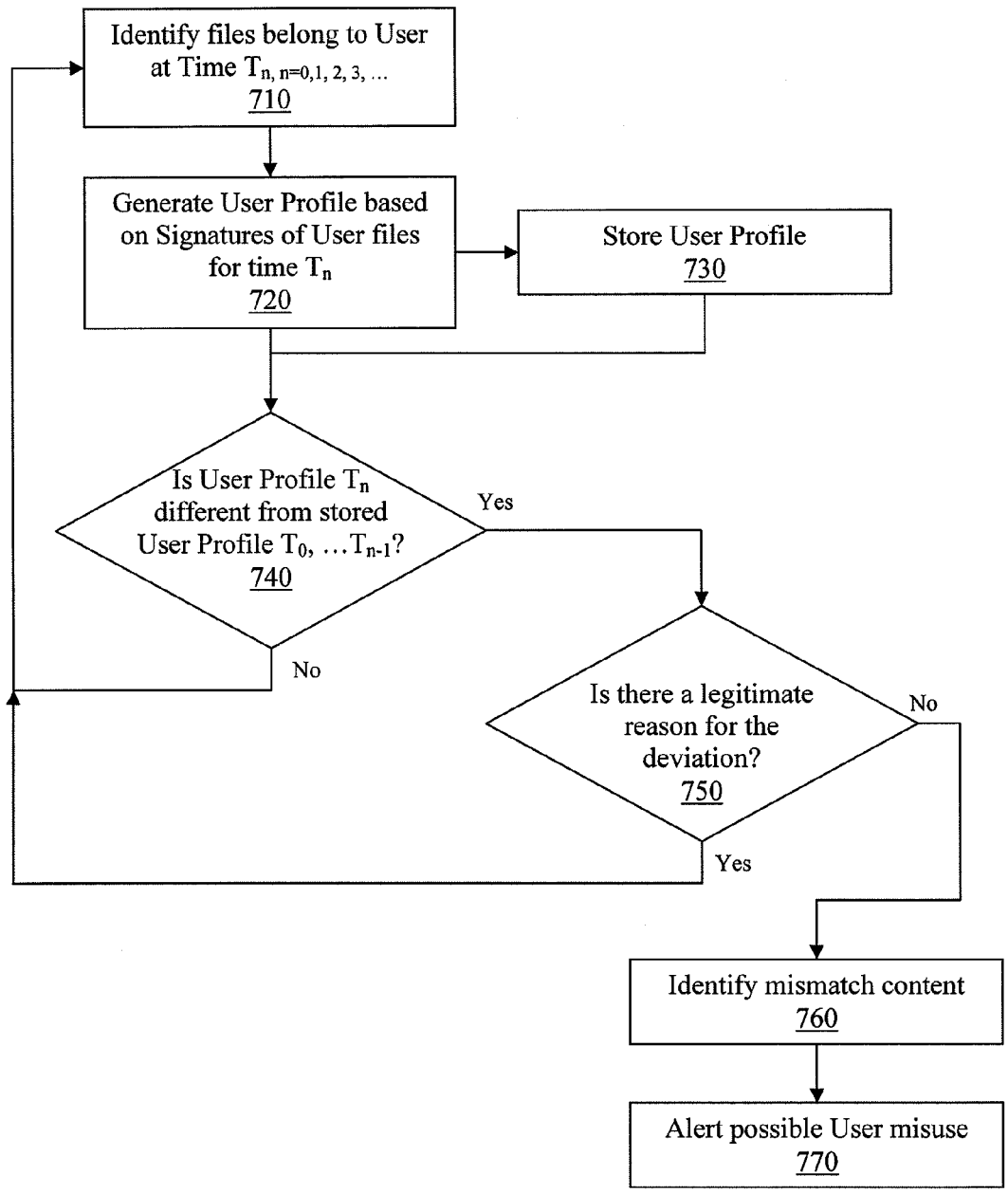
FIG. 7 is a flow chart illustrating another exemplary method for user misuse detection through the use of user signature profiles.

FIG. 7 presents another exemplary method for user misuse detection. All the files that belong to or are accessed by a user are identified based on ownership information and access information 710. Signatures of the entire collection of these files can be used to generate a user profile for the user 720 and are stored 730. An updated user profile is then generated at a later time, either by request or based on a periodic schedule. The newly generated user profile is then compared to any or all of the stored user profiles of the same user at earlier times 740. If no difference above a certain threshold is detected among the user profiles, there is no deviation in user behavior. However, if the newly generated user profile differs from the stored user profile above a certain threshold, a further inquiry is performed to determine whether there is a legitimate reason for such deviation of user behavior 750. If a legitimate reason is found, such as change in job assignment or upgrade of security clearance, the operation proceeds as normal. If no legitimate reason is found for the deviation of user behavior, the content of the mismatched signatures is identified 760, and an alert of possible user misuse is sent to authorized personnel or to a forensic investigator 770.

Figure 8:
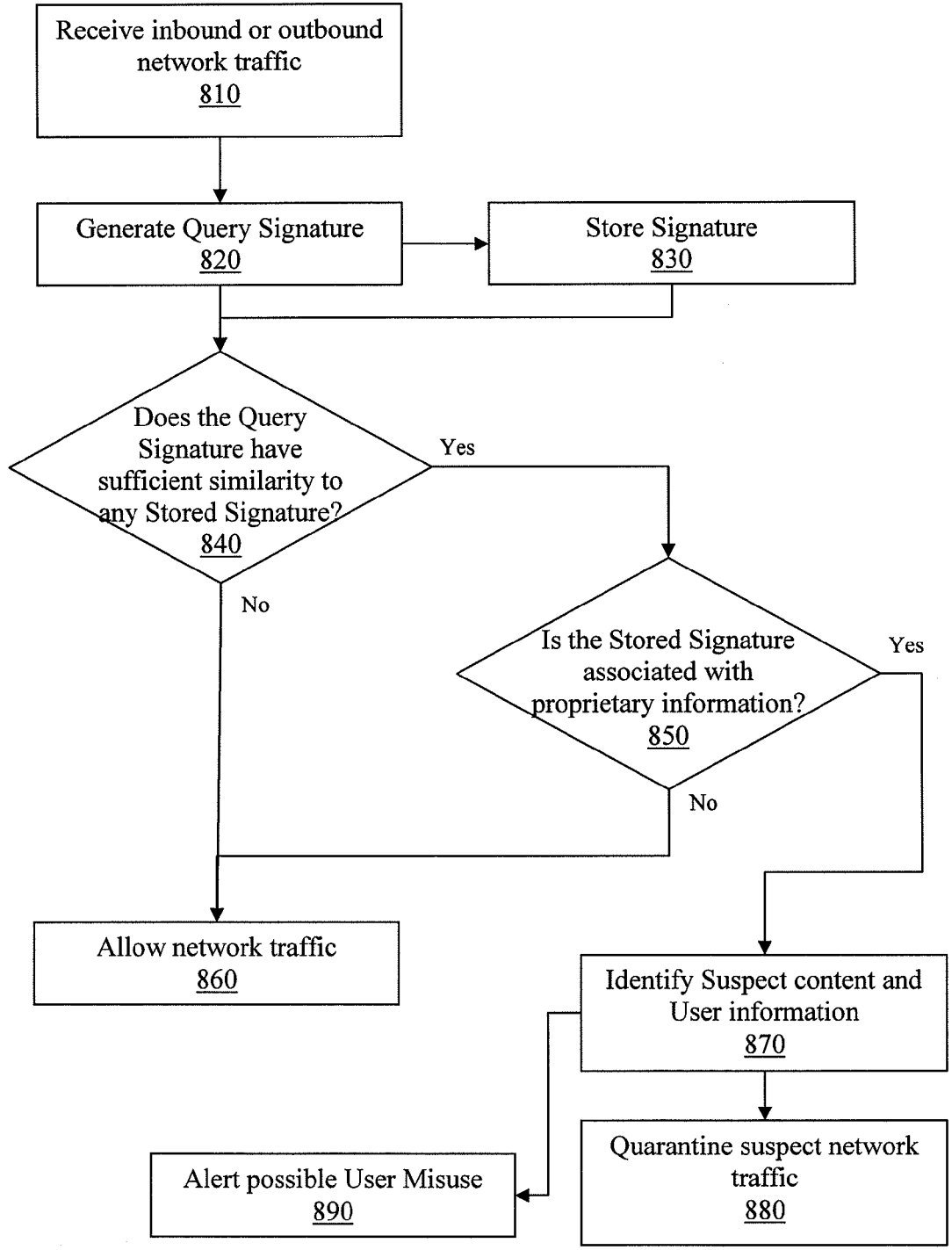
FIG. 8 is a flow chart illustrating an exemplary method for the detection of an unauthorized network communication of sensitive information.

FIG. 8 presents an exemplary method for detection of unauthorized network communication of sensitive information. When a network server receives inbound or outbound network traffic 810, a signature is then calculated based on the content of the network traffic 820 and stored 830. The signature is then used as a query signature and is compared to any previously stored signatures 840. In one embodiment of the invention, if the query signature has similarity to any stored signature above a certain threshold, it is then compared to a subset of all stored signatures, such as signatures of known documents containing classified or sensitive information, or illegal content 850. If the query signature does not have similarity above a certain threshold to any of the subsets of stored signatures, no classified, sensitive, or illegal content is detected. Network traffic is allowed to proceed as normal 860. However, if classified, sensitive, or illegal content is detected, suspect content and user information is identified 870, the network traffic is then quarantined 880, and an alert is sent to an authorized personnel or to a forensic investigator 890.

This proactive approach makes investigations faster, easier, and less expensive. Given one document, all systems containing that or similar documents can be found quickly and easily. This is true even if the given document is a hard copy. Text information can be extracted from the hard copy either automatically (e.g., scanned, segmented, and converted to text using optical character recognition) or manually (e.g., transcribed by hand into a computer readable format) and used to create a query signature. The present invention can identify systems where a document once existed, even if it is now or otherwise deleted. In classified computer networks not connected to the Internet, such as those employed by government intelligence agencies and defense contractors, strict control of content entering and leaving the classified network is necessary. However, traditionally, there generally is no effective mechanism to track the flow of information within the classified network. The present invention can locate any content within the classified network, and provide a system-wide tracking of any content of interest. In one embodiment of the invention, a real time, system-wide map of the distribution of any particular content can be generated and monitored.

This invention can also be used for evidence discovery. Given one user or a set of users, a forensic analysis could determine documents of interest. Those identified documents could be used to seed a fingerprint search across all systems. That would rapidly identify which other systems needed further consideration for analysis. The present invention can determine the source of files that were not permanently stored, such as temporary files deleted without a user's knowledge.

This invention can be further used for misuse detection. Many systems log accesses to restricted material. However, restricted material is usually defined by its location within the file system, or by other attributes of the file. Once the restricted material leaves the protected file systems location, or loses its original attributes, access logging will no longer be able to detect misuse of the restricted material. The present invention, however, can detect when the access logging fails by verifying that documents that should have been logged were logged. Collection statistics and fingerprints can determine when a document is atypical for a user, which may be a sign of document misuse. The present invention can also help to determine the source of leaks by identifying the systems within which a leaked document was present, and a time line that tracks movement the leaked document through a network.

This invention can also be used for intrusion response. When an intrusion is discovered, the signatures of files associated with the intrusion can be recovered. Even if the original files are deleted, the signatures can still be recovered based on time stamps. These recovered signatures can be used to examine across systems for similar intrusions, and also provide early detection to prevent intrusion from similar attacks.

Figure 9:
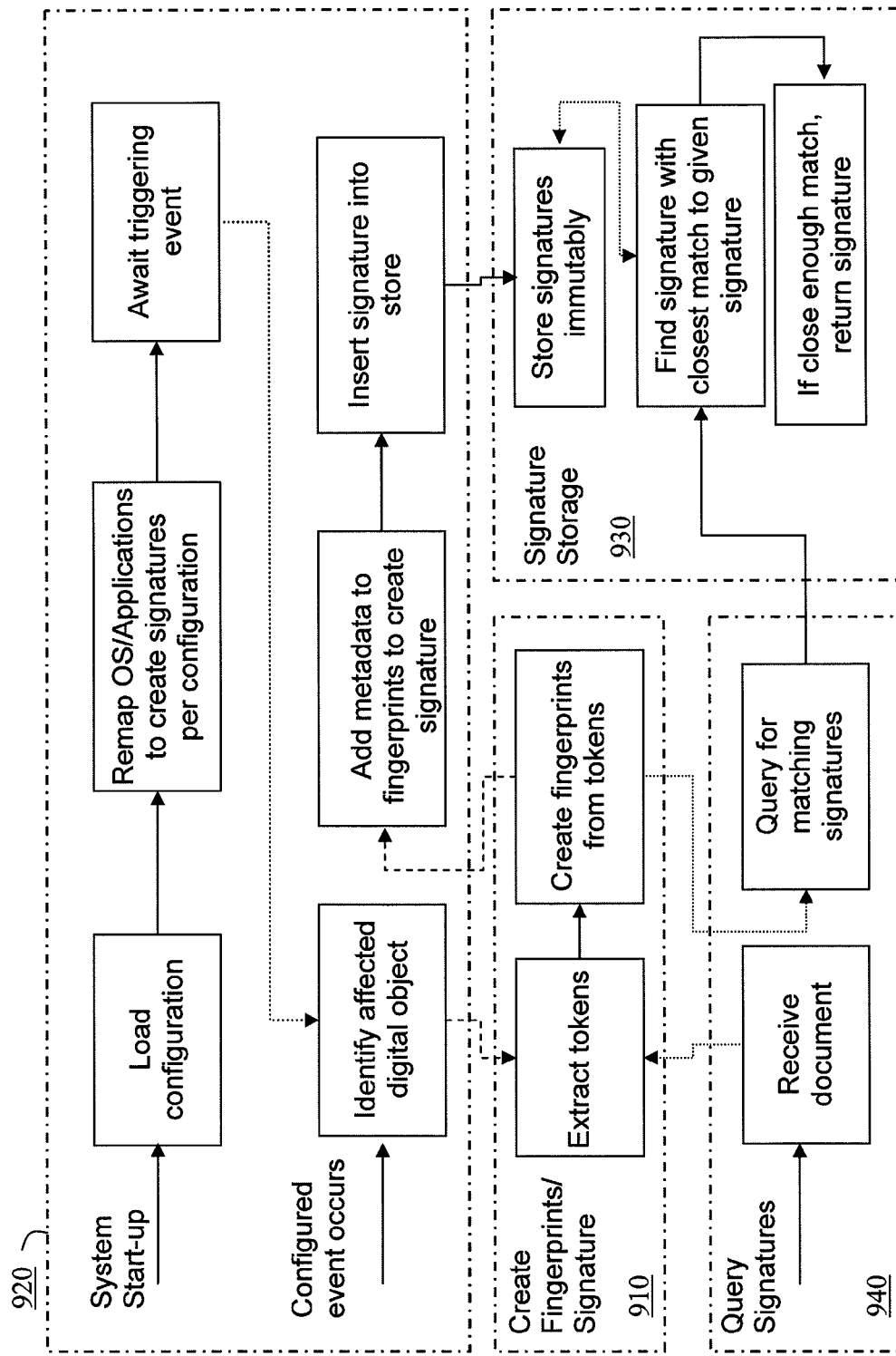
FIG. 9 is a schematic block diagram illustrating an exemplary embodiment of a system of the present invention, showing event trigger, fingerprint/signature generation, signature query and comparison, and signature storage.

FIG. 9 illustrates an exemplary system of the present invention. The system of FIG. 9 comprises four components: 1) a processor for creating/generating fingerprints and signatures for a target, such as a document 910; 2) an extension module to the operating system (OS) configured to trigger signature generation upon occurrence of a certain action 920; 3) a mechanism for storing the generated signatures 930; and 4) a comparator for querying the system for stored signatures and comparing those retrieved for similarity 940. The implemented system may have either a Windows service or Linux daemon running in the background to generate a signature for a given file and to store it, and then to query the stored signatures to determine similarity with other signatures. The system runs with administrator or root privileges.

The extension module of the operating system has several components. First the configuration information must be stored on the system. In Windows, this would be registry entries or configuration files. In Linux, a configuration file is used, which is stored in /etc or another location. The configuration information includes mechanisms for signature creation, other information to store with signatures, mechanism and location for signature storage, events that trigger signature creation and mechanisms for extracting text based on file type. Separate programs or modules can be called to perform text extraction. In Windows, the COM model can be used to extract text from Office documents. In Linux, various utilities can be used to extract text from different file types.

The signature creation is linked into the OS so that signatures are created when desired system events occur, such as file deletion, file copy between file systems, and file modification. As soon as the computer system starts, certain system events are remapped to invoke the signature creation process, and the system waits for the occurrence of these events. When any one of these events is captured, the OS invokes calls to the signature creation process. In Linux, this can be achieved by a loadable kernel module. In Windows, this can be done through a variety of ways. When called, the system identifies the digital object (file) that triggered the operation, and passes a copy or pointer to the file for processing to the fingerprints creation process. Tokens are extracted from the file and processed, fingerprints are generated for the retained token list, other information associated with the file (metadata) is incorporated with the fingerprints, and a signature is generated, all based on the criteria specified in the configuration information.

A basic system can incorporate the entire index of retained tokens (i.e., without filtration). In this embodiment of the invention, a simple tokenization of a document may include converting the entire document to lower-case (remove case sensitive information) and obtaining individual tokens. A token for this basic system is any string of length-4 or more separated by either white space or any form of punctuation. The individual tokens are then sorted according to Unicode ordering to obtain unique tokens. A hash code or bit vector is then generated for each token in the sorted unique token list. In another embodiment of the invention, the same process is used for tokenization of a document and sorting of the unique token list. The process also includes the filtering of the unique token list. Subsets of the unique token list are created based on a list of criteria including, but not limited to, keeping tokens of only 6 characters or longer in length, keeping tokens numbered (in order) 25-50, keeping every 7th token, keep every 25th token, or other similar rules. A hash code or bit vector is then generated for each subset of tokens.

Fingerprints may vary in complexity. A signature created based on a complete index of retained tokens, such as a list sorted according to Unicode, can be highly precise but support only minimal variance. The precision and tolerance to variance of a signature created based on a filtered index of retained tokens depends on the degree of filtration. A signature based on a highly filtered index provides high recall but low precision. The number of filters employed to generate signatures also affects the complexity. Multiple filters increase precision but also increase the time required for signature calculation and the storage space needed for signature safe-keeping.

A mechanism for storing signatures should be resilient against modification by users. Once the signature is created, it is stored securely. A user other than authorized personnel or a forensic investigator should have no means to modify or delete any signature entry. The signatures can be inserted into a database, allowing for easy queries and off-system storage. Alternatively, signatures can be stored in flat files having only root or administrator permissions.

When given a signature, one can check to see if the signature is in the store. If given a file or document, text is extracted from the file, fingerprints are created, then a signature, and the created query signature is checked against the store. If multiple fingerprints are used to represent a file, any or all of the fingerprints can be used to determine similarity above a predetermined threshold. A proper or predetermined threshold can be the matching of all or some of the fingerprints, a probabilistic analysis of the similarity of the fingerprints, or any other mathematical analysis directed to signature divergence. The higher the threshold, the lower the rate of false positives; however, the higher the rate of false negatives.

In another aspect of the present invention, the content of a target can be alternatively represented by selections of terms that are logically selected from the target. The selections of terms are conceptually and functionally similar to the above described fingerprints, and together with other information associated with the target, form a representation of the content of the target similar to the above-described signature. The collection of terms or a plurality of targets can further be organized and indexed in a data structure which links to or is associated with the representations of target.

Terms can be extracted from a target to represent its content. As an example, the content of a target that contains textual information can be defined by a selection of words and phrases within the target. The present invention extracts terms appropriate for one or more targets, which include, but are not limited to, bits, bytes, characters, digits, numbers, words, word sequences, phrases, sentences, meta-data, and information derived from these targets. In one embodiment of the present invention, terms may include stemmed and stopped words. Stemming and stop words are recognized by one skilled in the art as standard practice for information extraction in information-retrieval systems. For purpose of illustration, but without limiting the scope of the invention, stemming can be generally described as a process for reducing inflected (or sometimes derived) words to their stem, base, or root form. The stem, base, or root of a word in the context of stemming is not necessarily identical to the linguistic root of the word. It is sufficient that related words are mapped to the same stem, base, or root. Several varieties of stemming algorithms are currently available. The term "stop words" generally refers to words which are filtered out prior to, or after, the processing of natural language data (e.g., text). In the above-mentioned embodiment, stop words can be removed to yield a list of terms that represents the content of one or more targets. In other embodiments of the present invention, stop words may be intentionally preserved to include phrases in the list of terms. For targets that lack textual terms, their idiosyncratic characteristics can be identified and used to represent a target's contents. Feature points of images, video clips, audio waves, etc. can likewise be extracted and treated as terms. The present invention method extracts these terms in a variety of ways. Term selection can be achieved by providing a predetermined list of terms of interest by using a predetermined algorithm that automatically identifies terms of interest or by a combination of these two methods.

Once identified and extracted, the present invention method records in the representation of the target the presence and/or absence of each term by methods that include, but are not limited to, recording its presence or absence, its frequency, and/or its relative importance. The representation of the target also incorporates other information associated with the target that is extracted and combined with the terms. The other associated information may be data relevant to the target, and can be accessed through the operating system, which may include, but is not limited to, file name, date and time of record, user/owner information, and access history. Other associated information may also include data relevant to the target that is accessible through an application, which may include, but is not limited to, author, time of editing, number words, title, subject, comments, and any other customizable fields or application-specific information. There are numerous possibilities regarding the information that can be incorporated into a representation. A person skilled in the art could choose to incorporate any number of desired attributes of the target into a representation, depending on the specific implementation. In one embodiment of the present invention, the representation of the target records the inverse document frequency for each term. Other associated information includes, but is not limited to, the source document's name, owner, location, date, and host name. Such other associated information can also include, but is not limited to, term frequency within the document, positioning information within the document, weighting means, etc.

According to one aspect of the present invention, sets of targets may be processed simultaneously. It is also within the scope of the invention to process individual targets sequentially, or in parallel and then merged. When sets of targets are processed, the collection of terms contained within each individual target can be pooled and indexed in a data structure, such as an inverted index. An inverted index is an index data structure storing a mapping from content, such as words or numbers, to its locations in a target such as a database file, a document, or a set of documents. In other words, the inverted index is a data structure that is keyed to a list of terms such that each term references to a posting list that refers to targets that contain each of the terms.

Figure 10:
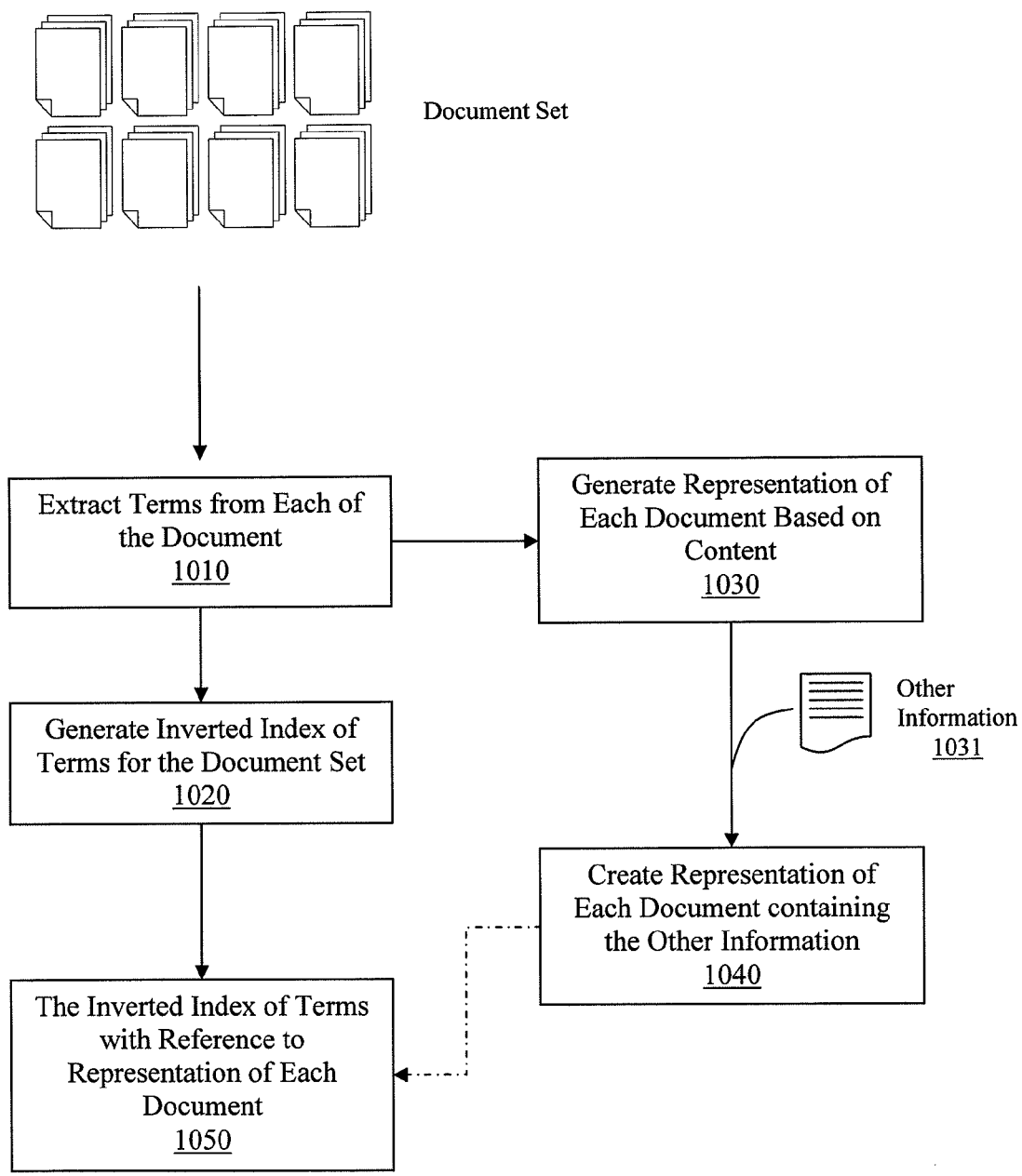
FIG. 10 is a flow chart illustrating an exemplary method of generating an inverted index for a set of documents according to the present invention.

FIG. 10 shows an example of the present invention utilizing the inverted index of a document set. For a given document set, individual documents are processed in parallel or in serial and then combined. Terms are extracted from each of the documents within the document set 1010. For purposes of illustration, but without limiting the present invention, the processing and extraction of terms may include the steps of identifying the format of a document, discarding formatting information, stemming, and removing stop words. All terms extracted from the document set are pooled and indexed. One exemplary method of indexing is alphabetical indexing. An inverted index of the document set is generated from the indexed terms of the document set 1020. For each document, its collection of terms together with frequency and positional information of the terms form a representation of the content of the document 1030. Other information 1031 associated with the original document, such as time/date, location, and ownership information, is incorporated with the selection of terms to form the representation of the document 1040. The posting list of each of the terms within the inverted index of the document set may include representations of each of the individual documents of the document set, or it may contain references to the representations of the documents stored elsewhere 1050.

Traditionally, an inverted index is not suitable for computer forensics. When used in information retrieval system, as the collection is modified, the inverted index is modified as well. The inverted index is constantly updated in response to the addition and removal of documents. Thus, in practice, as documents are deleted, they are removed from the inverted index. When a document is modified, the inverted index is updated to include reference to the modified document, but loses the references to the original document. The traditional manipulation of the inverted index is not appropriate when using it as a forensic examination application, in which case all versions of the targets must be maintained, or at the very least, an accurate representation of the targets must be maintained. According to one aspect of the present invention, representations of the contents of the targets along with other associated information including, but not limited to, file existence or date of deletion or of modification, type of modification, etc., are added or linked to the inverted index. The inverted index, according to the present invention, does not remove the posting of a removed target from the index. The inverted index maintains a reference to a representation of a target that is stored permanently, and which is not removed when the original target is deleted. Depending on the application, the associated other information in the representation, such as the indication that a file was deleted and the identification of such user who performed the action, may or may not be updated. In one embodiment of the present invention, the representation of the content of a deleted target is updated with information related to its deletion, such as time/date, user, and host/client computer where the deletion is performed. New representations of new targets are generated as these new targets are added to the system, and the inverted index is updated to include the new targets. When existing targets are modified, the representations of the targets are either updated to account for these modifications, or if the modifications are sufficiently large—the modified targets are treated as though they are new targets. For targets that are sufficiently modified or deleted and otherwise removed from the computer system, the original representations are retained with all associated information pertaining to such targets, which may also include information pertaining to the circumstances of the modification.

Figure 11:
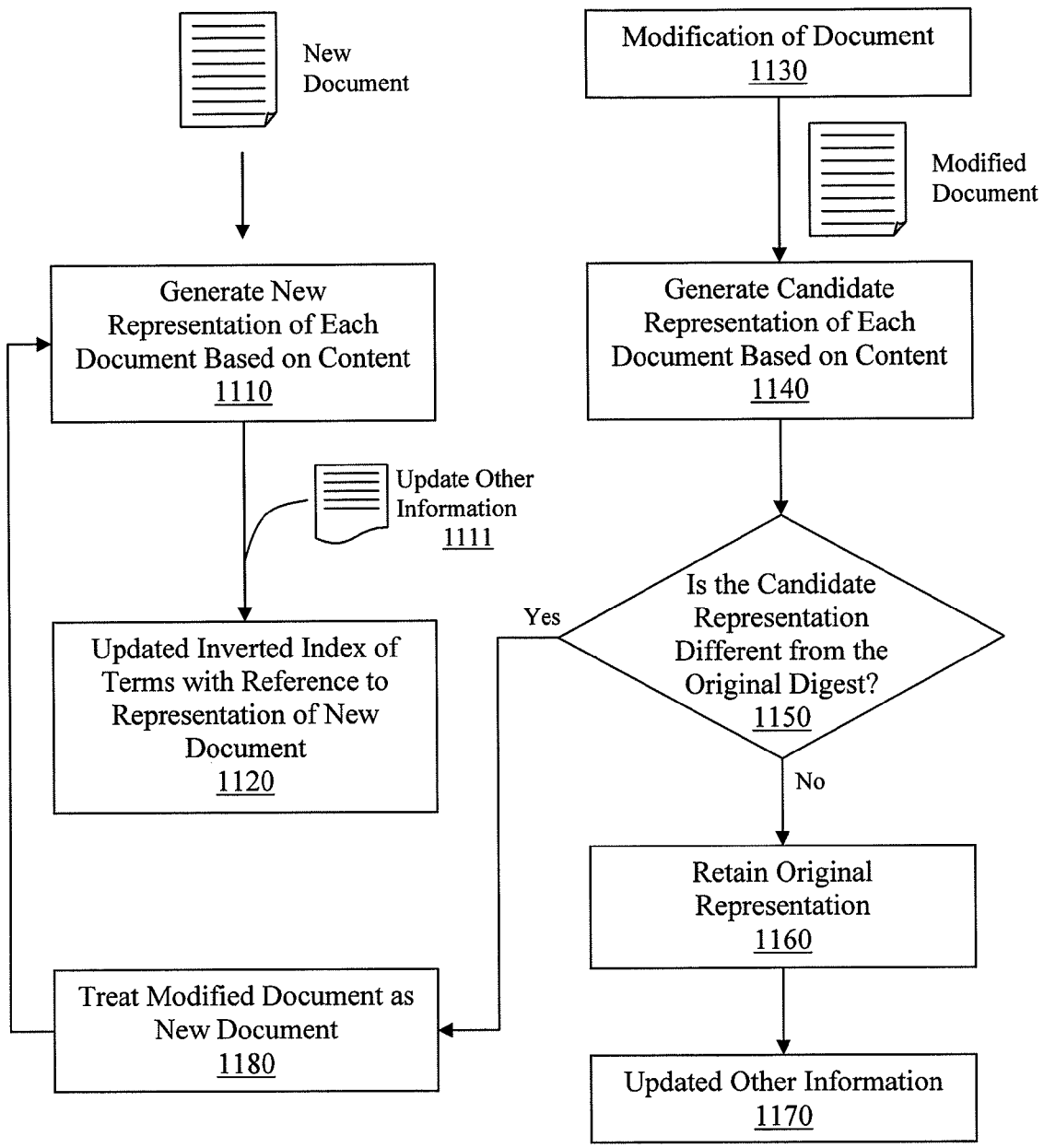
FIG. 11 is a flow chart illustrating an exemplary method for updating an inverted index in response to document addition and modification according to one aspect of the present invention.

FIG. 11 is a flow chart illustrating an exemplary method for document addition and modification according to one aspect of the present invention. For each new document that is added to the document set, a representation of the content of the new document is generated 1110. The inverted index for the document set is then updated 1120 to include the new document and the representation of its content, as well as other information associated with the new document 1111. When a document within the document set is modified 1130, a candidate representation of the content of the modified document is generated 1140. This candidate representation is compared with the representation of the original document 1150. When the modification is minor, (i.e., the similarity of the representations of the modified and original document is within a pre-determined threshold), the original representation of the document is retained 1160. Other information associated with the modified document is updated 1170. When the modification is significant (i.e., the similarity of the representations of the modified and original documents falls below a predetermined threshold), the modified document is treated as a new document 1180. The inverted index is updated to incorporate the modified document 1120, and a new representation of the modified document is generated and other associated information stored. The listing of the original document and its representation are not modified.

For one or more computer systems, the present invention permits individuals with the proper privilege to query an embodiment of the invention and the representation to determine the presence or absence of information that resides or resided on such computer systems. In one embodiment of the present invention, these queries can be performed directly on one or more individual machines. In another embodiment of the present invention, these queries can be performed remotely. For remote queries in a networked environment, one embodiment of the present invention transmits the query to one or more computer systems, which execute the query on the representation and return the answer to that query. For remote queries, another embodiment of the present invention includes a computer system that stores all of the representations from one or more other computer systems, queries all of these representations, and returns answers to those queries. For this embodiment of the present invention, one or more computer systems periodically transmit all or portions of their representations to the computer system responsible for storing all representations. This method also allows for these representations to be updated at any time by an individual with proper privilege. The method also allows for these representations to be generalized or compiled into a single representation for one or more computer systems.

The method of the present invention allows for manual and automated query formation. An individual with proper privileges may provide queries directly to a computer system employing the present invention method. A query can be a term or a collection of terms. Alternatively, an individual with proper privileges may provide information of interest in the form of a file, document, or any other format that is readable by a computer system (i.e., a query target), whereupon the present invention processes the file or document in the manner described above, and queries the inverted index of representations. The form of the query includes, but is not limited to, one or more terms, terms connected with logical operators, and queries in SQL. For a given query, the present invention method returns the representation of the target. Other information associated with the target can be extracted from the representation, which other information may include document name, host name, and any other requested meta-data that relate to the query.

Figure 12:
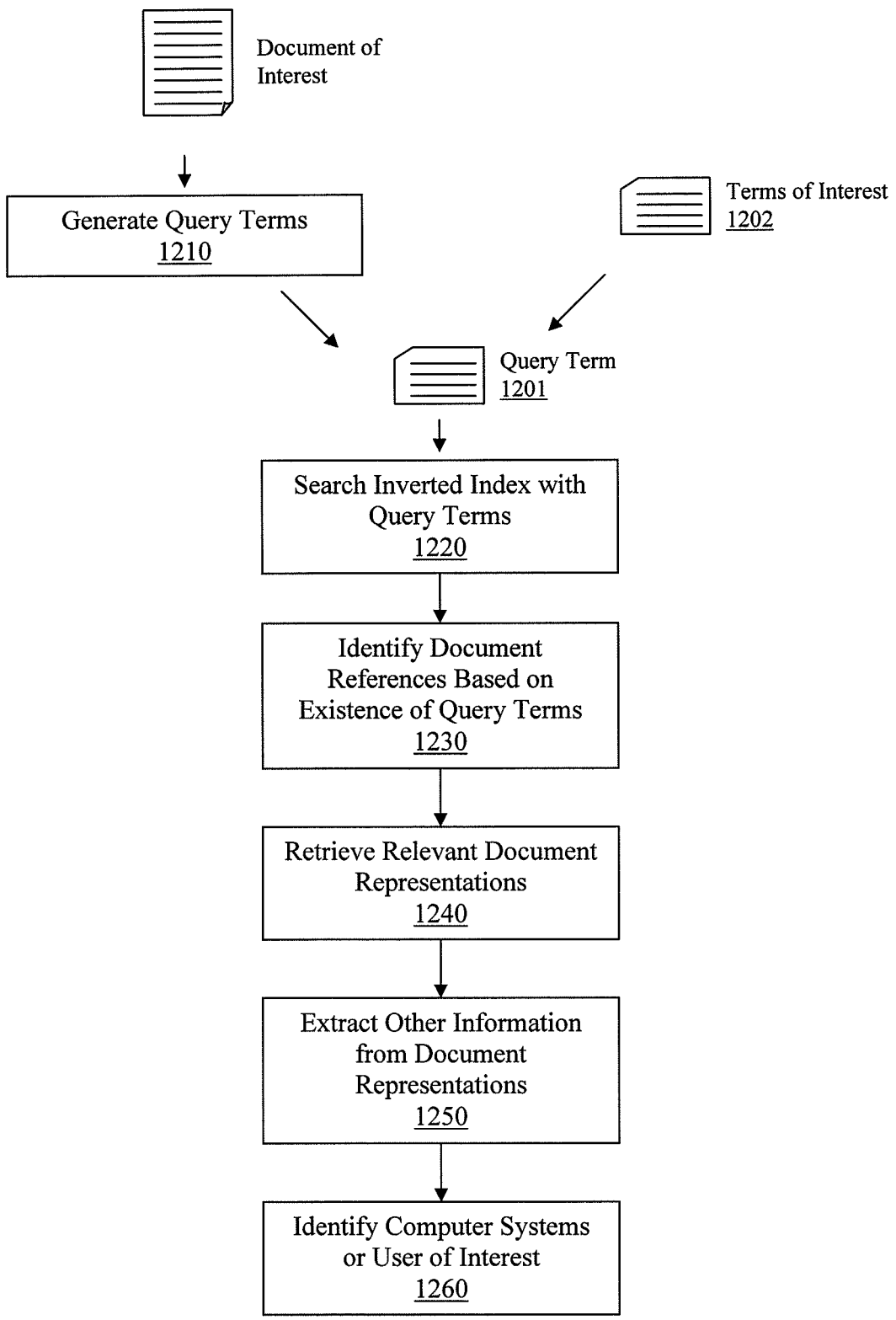
FIG. 12 is a flow chart illustrating an exemplary method for performing a latent search using an inverted index.

FIG. 12 is a flow chart that illustrates an exemplary method for performing a search with the inverted index according to one aspect of the invention. Query terms 1201 can be formed from a document of interest 1210 or from selected terms of interest 1202. A search is performed with the query terms 1201 against the inverted index 1220. Documents are identified 1230 based on the existence and frequency of the query terms 1201. Representations of the identified documents are retrieved 1240, and other information associated with the document representations are extracted 1250. Information such as time/date stamp, user name, and computer name can be used to identify user or computer of interest 1260.

Embodiment for Forensic Signatures for Forensic Processing

In a classic forensic environment, computers or other digital devices used in examination may not be seen by the investigator until they are seized at a crime scene or in an intelligence gathering operation. When multiple digital devices are seized and examined by several investigators, a standard need in forensics is to recognize previously seen files to avoid repeated examinations and to identify unseen files to conduct a thorough investigation. Traditional technologies using hash function or fuzzy hash function for this purpose can lack robustness. For example, only when two files are exactly identical, the hash values of these two files are the same. Even a slight change of a file such as adding a word results a different hash value. A fuzzy hash function that calculates a hash value for multiple parts of a file can not identify a file when the file is merely reformatted. If an investigator relies on the hash function or a fuzzy hashing function during the forensic processing, the investigator risks wasting precious time and resources on a same file.

The forensic signature created according to an embodiment includes a digital fingerprint and other information associated with a file. The digital fingerprint may represent contents of the file and is resistant to minor modification of the file.

After a digital device is seized, a dictionary is created based on the files included in the digital device. The dictionary may include words that are routinely used by a person or words that are commonly used in the filed included in the digital device. According to an embodiment, a digital fingerprint is created for each file of the seized digital devices according to the dictionary. One or more digital fingerprints may be created for one file using one or more dictionaries. The generated digital fingerprints combine with other information of the file to form a signature. An investigator may use the signature to identify unseen files. These signatures are not sensitive to minor changes of the file and are portable as long as the dictionary is transmitted along with these files.

In the forensic environment, the investigator may be required to investigate audio and video files recovered from seized digital devices. Many times an investigator has to review the entirety of the audio and video files so that an inserted segment may not be ignored. There is also the need of identifying the same or similar audio and video files. Again, the traditional hash or fuzzy hash functions can not fulfill such a need.

According to an embodiment of this invention, a forensic signature is created for an audio file and video file. The forensic signature includes digital fingerprints and meta information of the audio file or the video file, which has a similar structure as those described before. The forensic signature effectively identifies the same audio files and the same video files.

The digital fingerprint of a video file may be created based on segments of the video file. To create a digital fingerprint for a video file, the video file is parsed to locate changes in scene. The scene change may be detected based on changes in video shot. The video file is segmented according to the scene change. A number of representative information associated with each segment may be extracted. For example, the length of each scene segment is determined and a fingerprint of a video file may be an encoded series of lengths of all the scene segments. In another embodiment, each segment is analyzed using a sliding window. One or more key frames from each scene segment are extracted. In another embodiment, a KL transform (or any other component reduction computation) is performed on each segment. In another embodiment, subtitles or caption text are extracted to be used in creating the fingerprints.

The metadata of a video file includes information about the file such as filename, creator, length of the video, encoding, resolution, and etc. Other information that may be added to the metadata, if the video file is seized as forensic evidence, includes date and location of evidence collection, collecting agent, and etc.

To create a signature for an audio file, whether the audio file includes a speech or music is determined. If the audio file is determined to include music, a forensically accurate acoustic fingerprint can be identified and used in accord with techniques known to ordinarily skilled artisans, including using perceptual characteristics including average zero crossing rate, estimated tempo, average spectrum, spectral flatness, prominent tones across a set of bands, and bandwidth. If the audio file includes speech, a conversion from speech to text is performed. The text converted from the audio file is processed to generate a digital fingerprint for the audio file.

In some cases, multimedia files that includes both audio files and video files need to be investigated. For example, a DVD file includes multiple audio and video files, which may not have one-to-one correspondence. The DVD file needs to be treated as one file. To create a signature of such a multimedia file that includes both audio and video, fingerprints for audio and video are created separately and stored.

Informational Signatures

Another need during forensic processing is to help investigator to search the content of a file and to determine the content of a file. To fulfill such a need, the signature of a file can be informational rather than a collection of a plurality of computer-generated symbols.

In an embodiment, informational signatures are created, which may assist in determining what information is included in a file. A user may tokenize an informational object of interest such as an email address, name, phone number, account number, and etc. These tokens are then entered into a data structures, such as, for example, a Bloom filter or similar data structures, including data structures that can probabilistically or statistically determine if a tokenized term has been previously inserted. The result is then stored as an informational fingerprint. The informational fingerprint is then able to be used in targeted forensic investigations related to the specific information.

For example, a file may be tokenized to find all instances of Social Security Number (SSN). A fingerprint is created indicating the count of the number of SSNs identified in the file. When a laptop is lost, signature of all the files can by retrieved and examined to check if any file SSNs and counts thereof.

Massively Parallel Signature Matching.

In some instances, a large amount of signatures may be created for a computer system. When a query signature is to be compared with or matched with a large amount of signatures stored in the database, a considerable amount of time can be required for such a process, which adds overhead to the computer system.

The following explains the matching process carried out by another embodiment. When a query signature is to be matched, the database first determines a number of fingerprints included in the query signature. For each fingerprint, the database identifies the type of that fingerprint and determines all the matching fingerprints having the same type in the database. The same process is conducted for every fingerprint included in the signature. As a result, a plurality of lists of matched fingerprints is obtained from the database. The plurality of list is merged to create a merged list. A score is calculated for each matched fingerprint in the merged list based on closeness of the match. A final list is selected to include the signatures that have highest scores or scores higher than a predetermined threshold. If the matching process is implemented by a single computer system, a substantial amount of computer time is required to complete this process.

According to another embodiment of this invention, solutions to reduce the overhead of the computer system caused by the matching process include using a commercial service for matching or using idle computers within the same organizational network. For example, in an embodiment fingerprints of each type are compared in parallel on different computers. During the parallel matching process, a computer system is determined to be a master. It is within the scope of this invention however to likewise support multiple simultaneous master computing systems. A list of target fingerprints is partitioned by the master into a plurality of sub-lists to be distributed across resources, which may be referred to as slaves. The sub-lists are distributed to the slaves, which conducts the matching process for each sub-list. The slaves also score the closeness of each signature using their own computer system. The slaves return to the master a list of target fingerprints and associated scores. The master merges the returned lists and creates a master list. The master may traverse the returned lists and generates an overall score over all the fingerprint types. The master may start another parallel computation to locate the highest matching signature. The master may create a list that is composed of all the target signatures and the matching scores for each of the fingerprints within and distribute a subset of the list to a slave system for scoring. Exemplary execution environments for the parallel matching process may include cloud computing, hadoop, message passing interface, parallel virtual machine, Linda, and communicating sequential processes.

The present invention method utilizing term representation of content of a target and an inverted index of the representation is suitable to carry out other application of computer forensic and security measure described above.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is rather intended to include all changes and modifications that are within the scope and spirit of the invention.

What is claimed:

1. A method of generating forensic evidence of a digital file, comprising:
    selecting a token indicating an informational object;
    generating a digital fingerprint of the digital file using the selected token; and
    creating the signature that includes the digital fingerprint and meta data of the digital file,
    wherein the informational object has semantic meanings, represents specific contents of the digital file and represents more information than a collection of computer-generated symbols, and
    wherein the signature is proactively generated for computer forensic evidence of the digital file and configured to allow a forensic analysis with the computer forensic evidence, and
    wherein a computer operation that changes the informational object causes proactive updating of the signature.

2. A method of generating forensic evidence of a video, comprising
    detecting scene changes of the video;
    segmenting the video into a plurality of segments corresponding to each scene change;
    extracting a representation from each segment
    forming a digital fingerprint based on the representations; and
    creating a signature by combining the digital fingerprint with predetermined metadata of the video,
    wherein the signature is proactively generated for computer forensic evidence of the video and configured to allow a forensic analysis with the computer forensic evidence, and
    wherein a computer operation the video causes proactive updating of the signature.

3. A method of claim 2, wherein the representation includes one or more frames of each segment.

4. A method of claim 2, wherein the representation includes length information of each segment.

5. A method of claim 2, wherein the representation includes a subtitle and caption text of each segment.

6. A method of generating forensic evidence for an audio file, comprising:
    determining whether the audio includes music or speech;
    generating, if the audio includes speech, a transcript of the speech;
    extracting a representation from the transcript;
    forming a digital fingerprint based on the representation; and
    creating a signature by combining the digital fingerprint with predetermined metadata of the audio,
    wherein the signature is proactively generated for computer forensic evidence of the audio and configured to allow a forensic analysis with the computer forensic evidence, and
    wherein a computer operation that changes the audio file causes proactive updating of the signature.

7. A method of claim 1, further comprising:
    extracting a plurality of tokens from the digital file according to the selected token; and
    inserting the extracted plurality of tokens into a data structure that probabilistically determines whether a token was previously inserted.

8. The method of claim 1, wherein the selected token includes a token selected from the group consisting essentially of: an email address, a name, an account number, and a social security number.

9. A computer-readable non-transitory storage medium storing an executable program, when executed, causing a computer system to execute a method of generating forensic evidence of a digital file, comprising :
    selecting a token indicating an informational object;
    generating a digital fingerprint of the digital file using the selected token; and
    creating the signature that includes the digital fingerprint and meta data of the digital file,
    wherein the informational object has semantic meanings, represents specific contents of the digital file and represents more information than a collection of computer-generated symbols, and
    wherein the signature is proactively for computer forensic evidence of the digital file and configured to allow a forensic analysis with the computer forensic evidence,
    a computer operation that charges the informational object causes proactive updating of the signature.

10. A computer-readable non-transitory storage medium storing an executable program, when executed, causing a computer system to execute a method of generating forensic evidence of a video, comprising:
    detecting scene changes of the video;
    segmenting the video into a plurality of segments corresponding to each scene change;
    extracting a representation from each segment;
    forming a digital fingerprint based on the representation; and
    creating a signature by combining the digital fingerprint with predetermined metadata of the video,
    wherein the signature is proactively generated for computer forensic evidence of the video and configured to allow a forensic analysis with the computer forensic evidence, and
    a computer operation that changes the video causes proactive updating of the signature.

11. A computer-read-able non-transitory storage medium storing an executable program, when executed, causing a computer system to execute a method of generating forensic evidence for an audio file, comprising:
    determining whether the audio includes music or speech;
    generating, if the audio includes speech, a transcript of the speech;
    extracting a representation from the transcript;
    forming a digital fingerprint based on the representation; and
    creating a signature by combining the digital fingerprint with predetermined metadata of the audio,
    wherein the signature is proactively generated for computer forensic evidence of the audio and configured to allow a forensic analysis with the computer forensic evidence,
    a computer operation that changes the audio file causes proactive updating of the signature.

* * * * *